United States Patent [19]

Morohashi et al.

[11] Patent Number: 6,105,003
[45] Date of Patent: *Aug. 15, 2000

[54] CUSTOMER DATA PROCESSING SYSTEM PROVIDED IN A SHOWROOM

[75] Inventors: Yoshiharu Morohashi; Akiyo Kobara; Satomi Sakai, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/508,082

[22] Filed: Jul. 27, 1995

[30] Foreign Application Priority Data

Aug. 5, 1994 [JP] Japan .................................. 6-184838

[51] Int. Cl.[7] ............................................ G06F 17/60
[52] U.S. Cl. ................................................ 705/26
[58] Field of Search .................................. 395/226–228, 395/201; 283/56; 340/825.33–825.35; 705/26–28; 364/424.03

[56] References Cited

U.S. PATENT DOCUMENTS

| | | | |
|---|---|---|---|
| 4,404,639 | 9/1983 | McGuire et al. ........................ | 364/551 |
| 4,567,359 | 1/1986 | Lockwood . | |
| 4,972,318 | 11/1990 | Brown et al. ........................... | 395/226 |
| 5,146,404 | 9/1992 | Galloway et al. ...................... | 395/201 |
| 5,307,260 | 4/1994 | Watanabe et al. . | |
| 5,493,490 | 2/1996 | Johnson ................................. | 235/376 |
| 5,541,840 | 7/1996 | Gurne et al. ........................... | 364/424.03 |
| 5,570,291 | 10/1996 | Dudle et al. ........................... | 364/468.01 |

FOREIGN PATENT DOCUMENTS

| | | |
|---|---|---|
| 271280 | 6/1988 | European Pat. Off. . |
| 410036 | 1/1991 | European Pat. Off. . |

OTHER PUBLICATIONS

8294 IEEE Expert vol. 9, No. 2, Apr. 1, 1994 Los Alamitos, pp. 23–32, Stafford et al., "Delivery Marketing Expertise to the Front Lines".

*Primary Examiner*—Frantzy Poinvil
*Attorney, Agent, or Firm*—Armstrong, Westerman, Hattori, McLeland & Naughton

[57] ABSTRACT

A customer data processing system for quick sales of desired goods, for example, a car, based on a questionnaire obtained from a customer. A salesman estimates desired goods based on the questionnaire, and a serviceman estimates service of the goods. The questionnaire, the estimation and decision of the goods are displayed on a screen and performed through the display. The system includes: a sales terminal having an input unit for inputting customer data, such as a name, an address, desired goods, etc., which are obtained from answers from a customer, in accordance with messages displayed on a screen; and an office terminal connected to the sales terminal through a transmission line and having a data registering unit and a customer data storage unit to sort the answers for each customer and to register the sorted answers into the data registering unit.

9 Claims, 50 Drawing Sheets

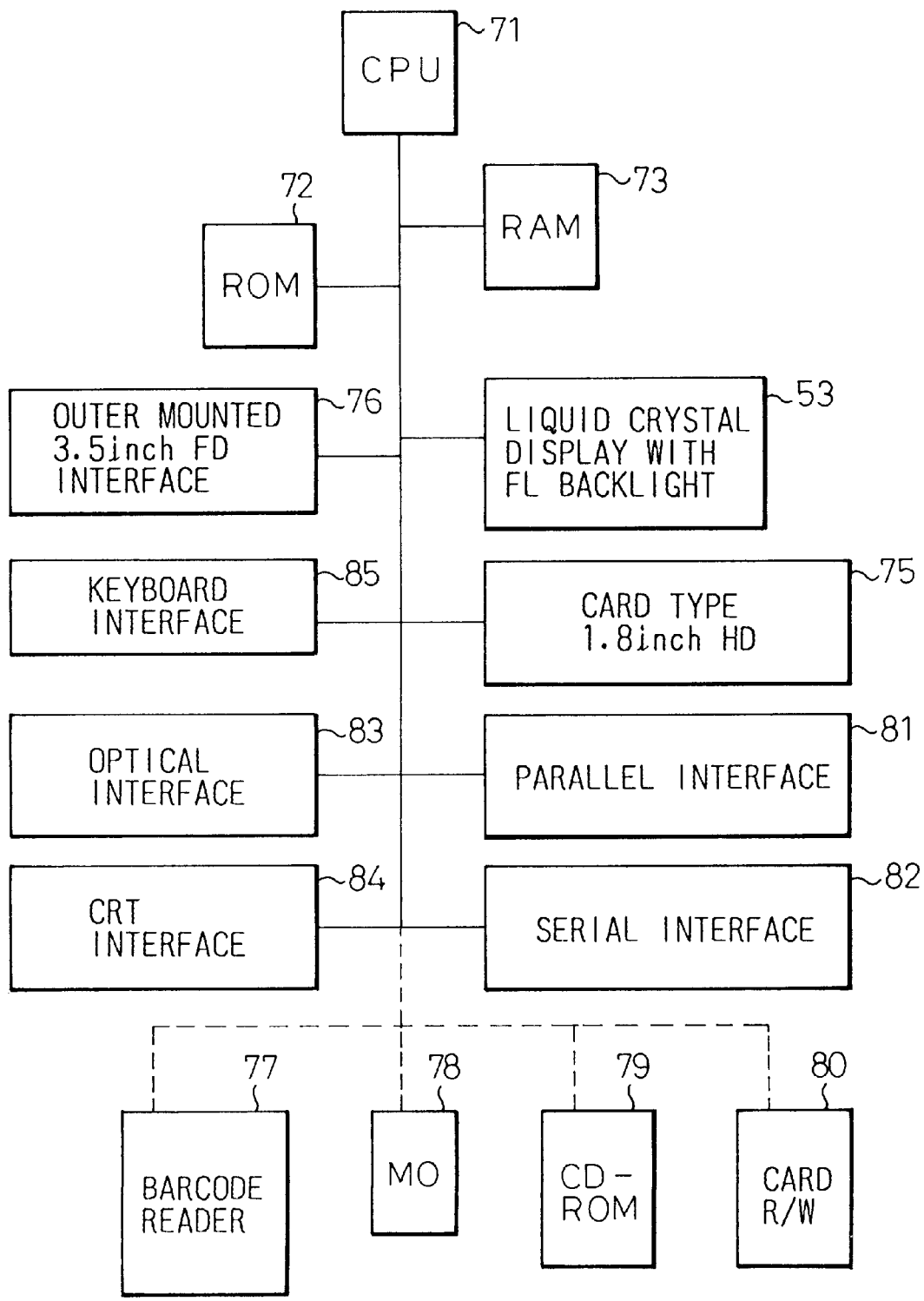

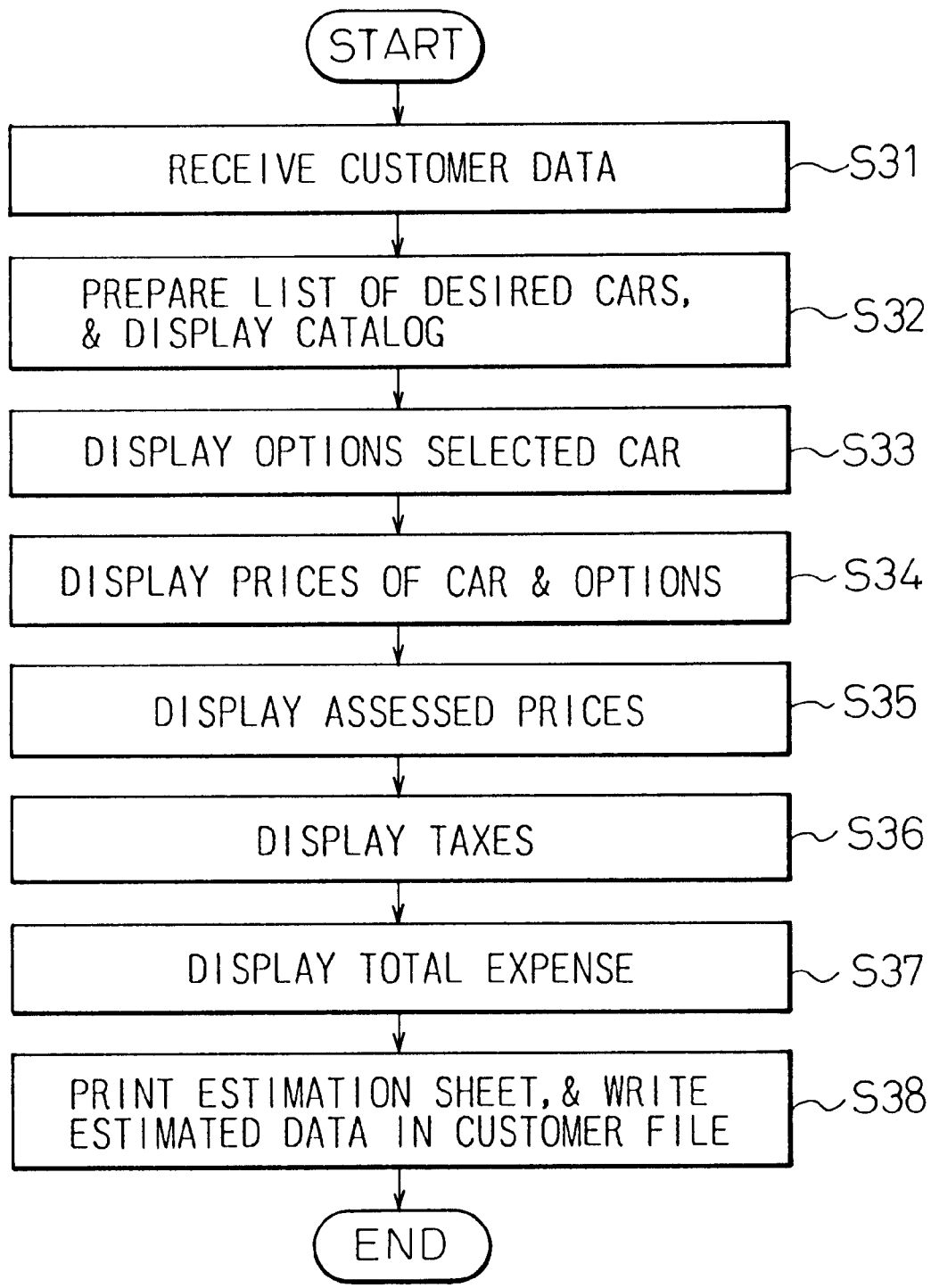

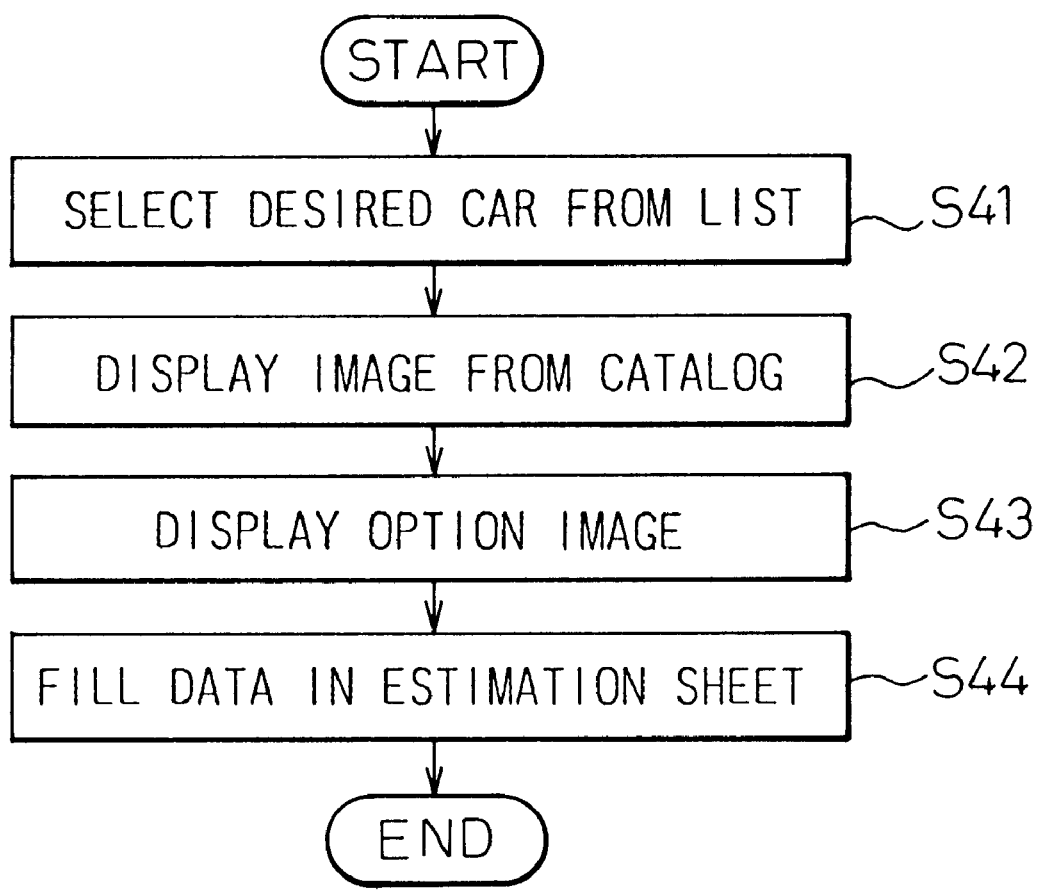

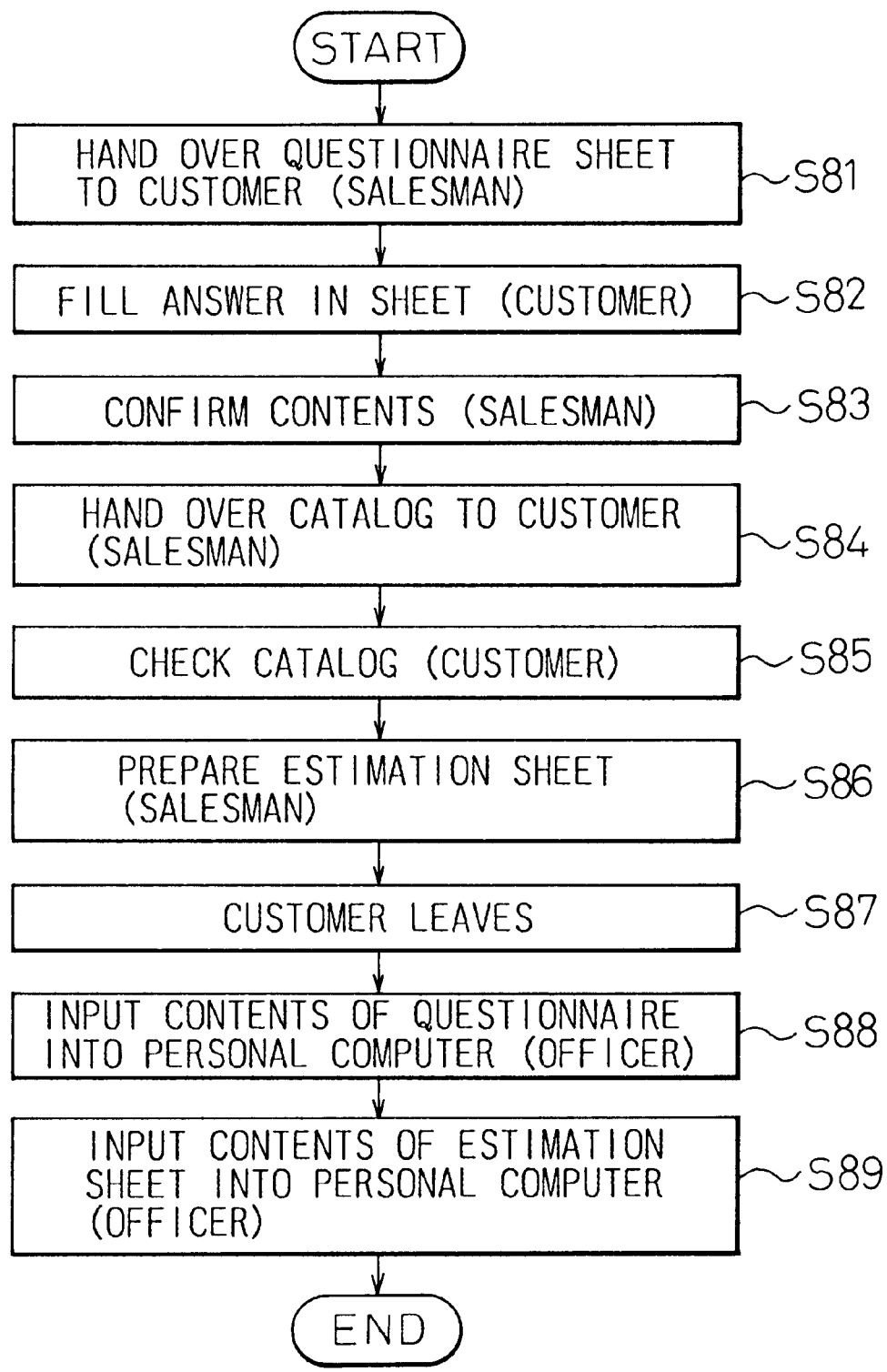

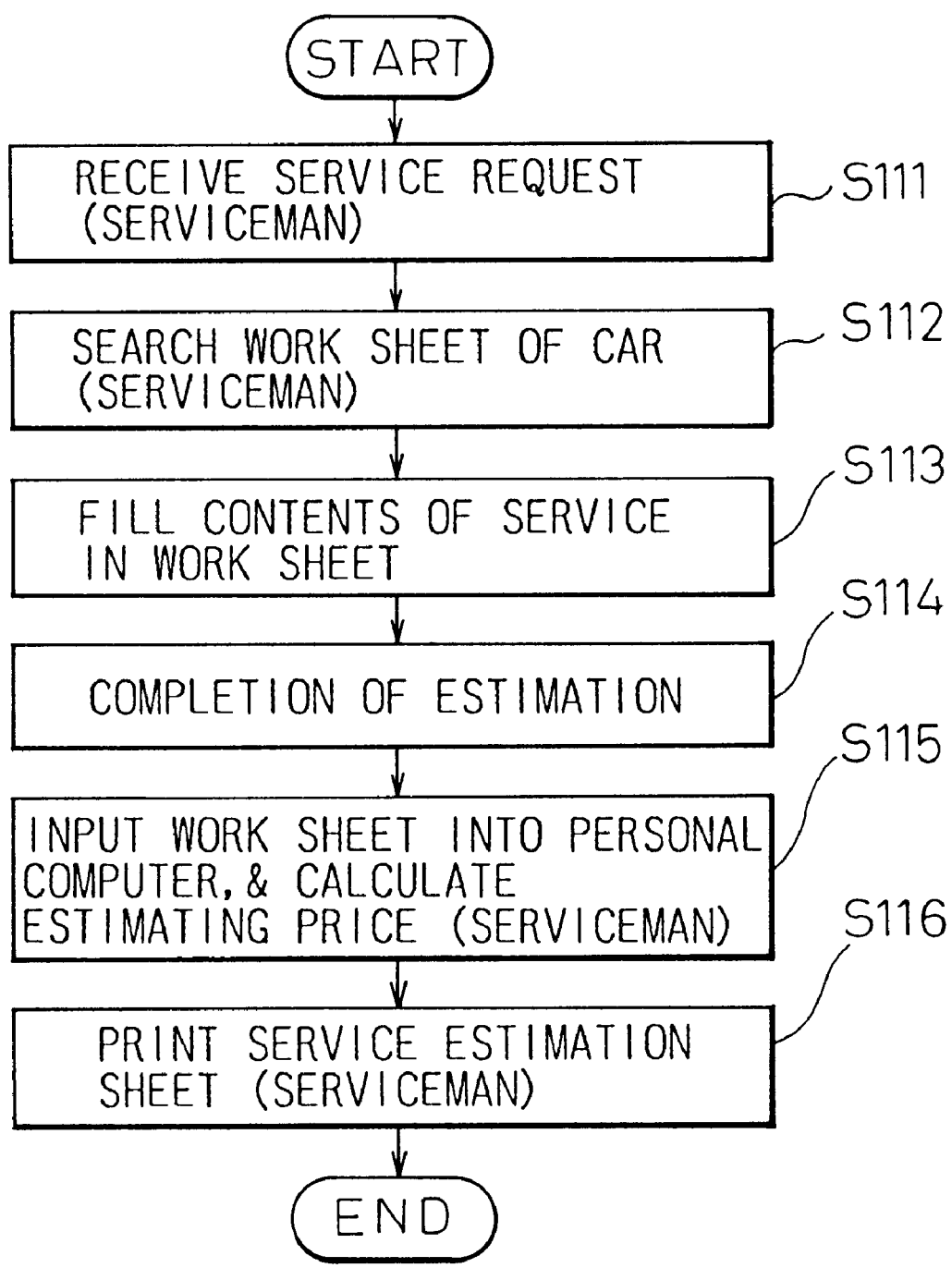

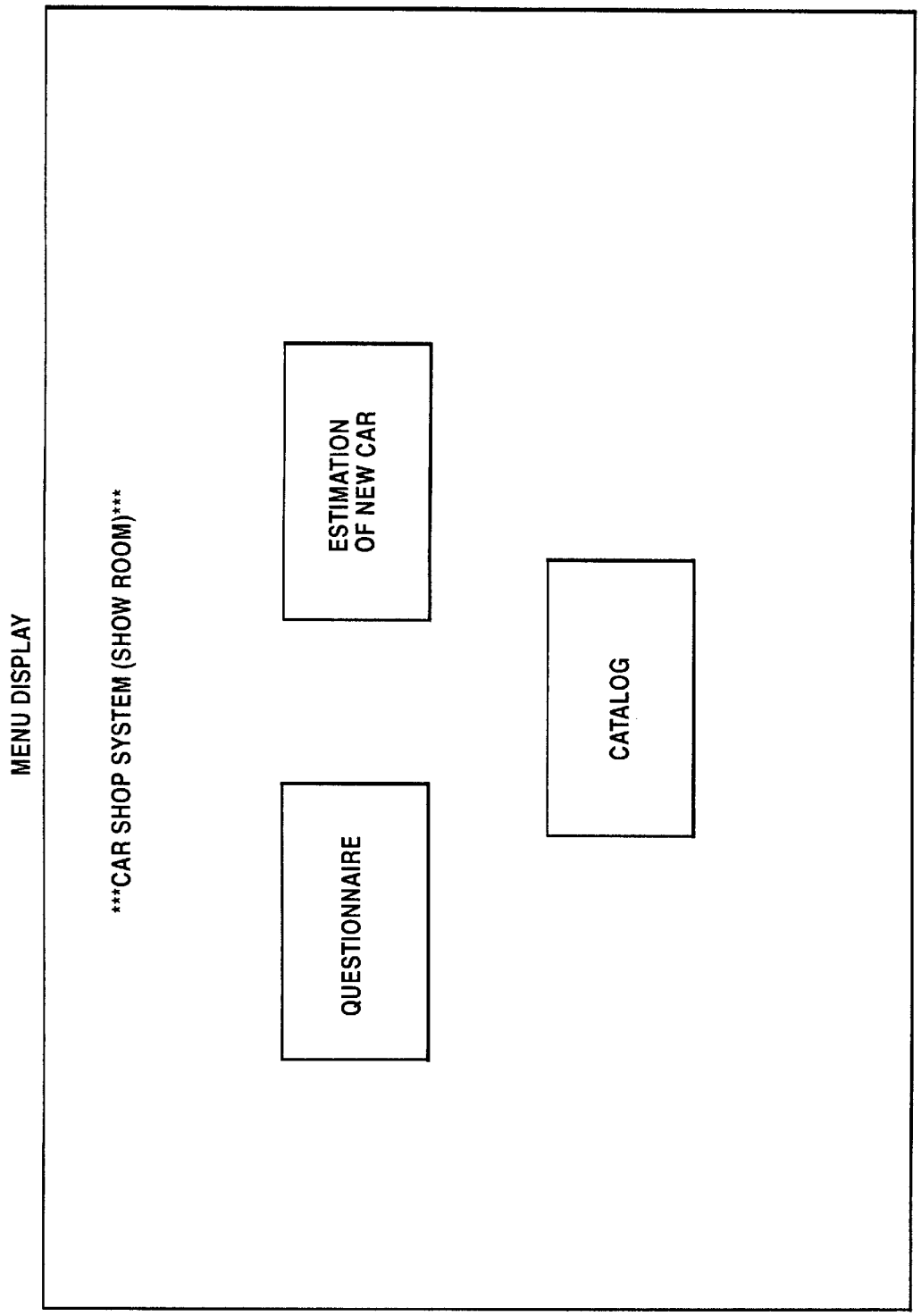

Fig.18

QUESTIONNAIRE DISPLAY (1/2)

CUSTOMER No. : 0000001234

NAME :

ADDRESS : 〒 ☐☐☐-☐☐

TELEPHONE NUMBER :

DAY OF BIRTH : ☐☐ YR ☐☐ MO ☐☐ DA

AGE : ☐☐

OCCUPATION :
- BUSINESSMAN
- OFFICER
- INDEPENDENT WORK
- STUDENT
- OTHER

CONTINUED

ESTIMATION DISPLAY (1/4)

CUSTOMER No. : 0000001234

NAME : ☐☐

ADDRESS : 〒 ☐☐☐ — ☐☐ ☐

TELEPHONE NUMBER : ☐☐☐☐☐☐☐☐☐☐

DAY OF BIRTH : ☐☐ YR ☐☐ MO ☐☐ DA  AGE ☐☐

CHANGE : YES

KIND OF NEW CAR : — X X X X        OPTION

KIND OF
PRESENT CAR : — X X X X        OPTION

ESTIMATION DISPLAY (2/4)

CHANGE : [YES]

KIND OF
NEW CAR : — [x x x x]
SPEC — [1 6 0 0 G T] [TWIN CAM] [OPTION]

KIND OF
PRESENT CAR : — [x x x x]
SPEC — [x x x x] [x x x x x x x x] [OPTION]

ESTIMATION DISPALY (3/4)

NAME OF CAR: X X X X
SPEC : 1 6 0 0   G T   TWIN CAM

| ITEMS | PRICE | SUBTOTAL |
|---|---|---|
| BODY PRICE<br>AUTO DOOR MIRROR<br>AIR BAG | x.xxx.xxx<br>xx.xxx<br>xx.xxx | xxx.xxx |
| TRADE-IN PRICE | | |
| TOTAL | | x.xxx.xxx |

CONTRACT : [NO]   PRINT : [YES]

DELIVERY :   YR  MO  DA

BEFORE PAGE

Fig. 23

ESTIMATION DISPALY (4/4)

NAME
OF CAR : X X X X
SPEC : 1 6 0 0 G T TWIN CAM

| ITEMS | PRICE | SUBTOTAL |
|---|---|---|
| BODY PRICE<br>AUTO DOOR MIRROR<br>AIR BAG | X.XXX.XXX<br>XX.XXX<br>XX.XXX | XXX.XXX |
| TRADE-IN PRICE | DESCOUNTED PRICE<br>￥ ▢▢▢▢▢▢<br>OK    NO | |
| TOTAL | | X.XXX.XXX |

CONTRACT : NO          PRINT : YES          BEFORE PAGE

DELIVERY :          YR   MO   DA

Fig. 25

CATALOG DISPALY (2/2)

NAME OF CAR : ──── xxxx

SPEC : ──── 1600 GT TWIN CAM

DATA xxx cm (W) xxxx cm (D) x cm (H)
10 MODE : xx km/ℓ
STANDARD :
OPTION :

DATA

OK

BODY PRICE ¥ xxxx

Fig.27 LIST OF SERVICE REQUEST DISPLAY

CUSTOMER No.
X X X X
.
.
.
.
.
.

CUSTOMER NAME
X X X X
.
.
.
.
.
.

CAR DATA
NAME-TYPE-REGISTERED-X X X X
YEAR
.
.
.
.

BEFORE

NEXT

Fig.28

SERVICE ESTIMATION DISPLAY (1/2)

CUSTOMER No. : 000000123

NAME : _____

ADDRESS : 〒___ — ___

TELEPHONE NUMBER : _____

SALESMAN : 0123456789    FUJI TORU

Fig. 29

SERVICE ESTIMATION DISPLAY (2/2)

TYPE :
NAME OF CAR : X X X X
SPEC :
BODY NUMBER :
REGISTERED NUMBER:
FIRST ERGISTERED DATE : ___YR___MO
TRAVELING DISTANCE : ☐☐☐☐☐ km
BODY TEST DUE DATE : ___YR___MO___DA
: ☐☐☐☐

Fig. 30
PARTS DISPLAY (1/2)

(IMAGE OF CAR)

NAME OF CAR : × × × ×

Fig. 31

PARTS DISPLAY (2/2)

SERVICE ESTIMATION

PARTS CODE (IMAGE OF PARTS)

CODE : 1 2 3 4 5 6 7 8 RIGHT
LEFT/RIGHT :
SERVICE METHOD :
QUANTITY : PIECES SERVICE

OK  CANCEL

Fig.32

EXPENSE DISPLAY

| | | | | | | | | | |
|---|---|---|---|---|---|---|---|---|---|
| CHARGE FOR SPARE CAR | : | ON | ¥ | | | | | | |
| ESTIMATION CHARGE | : | ON | ¥ | | | | | | |
| PHOTO CHARGE | : | ON | ¥ | | | | | | |
| × × × × | : | ON | ¥ | | | | | | |
| × × × × | : | ON | ¥ | | | | | | |
| × × × × | : | ON | ¥ | | | | | | |
| × × × × | : | ON | ¥ | | | | | | |
| × × × × | : | ON | ¥ | | | | | | |
| × × × × | : | ON | ¥ | | | | | | |

Fig. 33

ESTIMATION DISPLAY

| CODE | NAME | METHOD | QUANTITY | | ORDER | EXPENSE |
|------|------|--------|---|---|-------|---------|
| | | | | USE | | |
| 1111111 | DOOR MIRROR (R) | CHANGE | 1 | ☐ | △ | xx.xxx |
| 2222222 | DOOR GLASS (R) | CHANGE | 1 | ☐ | ☐ | xx.xxx |
| 3333333 | DOOR GLASS (L) | CHANGE | 1 | ☐ | ○ | xx.xxx |
| | PHOTO CHARGE | — | — | — | — | — |
| | WORK CHARGE | — | — | — | — | xx.xxx |

△ ORDERED
☐ UNORDERED
○ DISUSE

TOTAL xxx.xxx

SERVICE TERM: ☐

SERVICE COMPLETION: YR MO DA H

INITIAL DISPLAY

CAR SHOP SYSTEM (OFFICE)

◇ EDITION OF QUESTIONNAIRE
◇ PROCESS OF NEW CAR ESTIMATION
◇ PROCESS OF SERVICE ESTIMATION
◇ ADDITIONAL ORDER
◇ SALES MANAGEMENT
◇ REGISTER OF SALESMAN

◇ COMPLETION

LIST OF CUSTOMER DISPLAY

EDITION OF QUESTIONNAIRE DATA

◇ FUJITSU TARO    FINISHED
◇ FU?? JIRO       UNFINISHED
◇ FUJITSU SABURO  UNFINISHED

BEFORE PAGE    NEXT PAGE

FINISH

Fig. 36

EDITION DISPLAY

EDITION OF QUESTIONNAIRE (1/X)

NAME : FUJITSU JIRO

NAME : FU?? JIRO

BEFORE PAGE  NEXT PAGE

FINISH

Fig.38

NEW CAR ESTIMATION DISPLAY

DERIVERY:  ___YR ___MO ___DA

PROCESS OF NEW CAR ESTIMATION

PAY: 1 UNPAYED  
(1: PAYED  
2: UNPAYED)

| ITEMS | PRICE | SUB-TOTAL |
|---|---|---|
| BODY PRICE<br>DOOR MIRROR<br>AIR BAG | X. XXX. XXX<br>XX. XXX<br>XX. XXX | XXX. XXX |
| TRADE-IN PRICE | | |
| TOTAL | | X. XXX. XXX |

(1/2)

☐ FINISH  ☐ ☐ ☐ ☐ BEFORE PAGE  ☐ NEXT PAGE  ☐ ☐ ☐

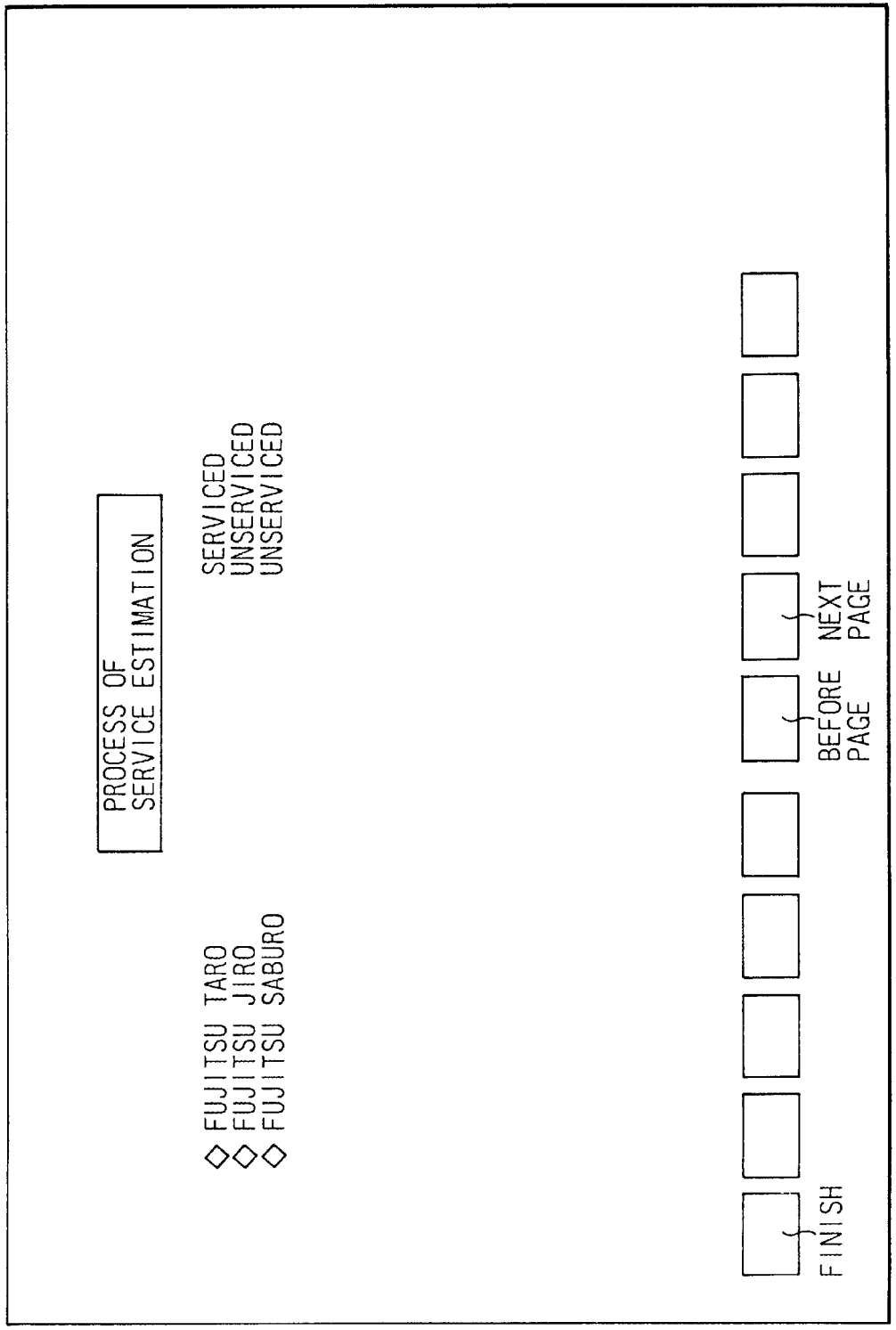

Fig.40

SERVICE ESTIMATION SHEET DISPLAY

PROCESS OF SERVICE ESTIMATION

SERVICE NUMBER : 000000001
SERVICE TERM : ___ DY
FINISH DATE : ___ YR ___ MO ___ DA ___ H

PAY : 1 (1: UNPAYED  2: PAYED)
SALESMAN : FUJI TORU

| CODE | ITEMS | METHOD | QUNTITY | USE | ORDER | PRICE |
|------|-------|--------|---------|-----|-------|-------|
| 11111111 | DOOR MIRROR (R) | ○○○ | 1 | ○ | △ | XX.XXX |
| 22222222 | DOOR GLASS (R) | ○○○ | 1 | ○ | △ | XX.XXX |
| 33333333 | DOOR GLASS (L) | ○○○ | 1 | ○ | ○ | XX.XXX |
|  | PHOTO CHARGE | — | — | — | — | XXX |
|  | WORK CHARGE | — | — | — | — | XX.XXX |

CHANGE

△ ORDERED
△ ORDERED
○ UNORDERED

PLANED

TOTAL  ￥ XXX.XXX   (1／1)

[ ] FINISH  [ ] ESTIMATION  [ ] DATA  [ ] [ ] BEFORE PAGE  [ ] NEXT PAGE

Fig. 41

SERVICE ESTIMATION DATA DISPLAY

| PROCESS OF |
| SERVICE ESTIMATION |

CUSTOMER No. :

NAME OF CAR :

BODY TEST DUE DATE :

COLOR CODE :

NAME :
ADDRESS: 〒
PHONE No. :
TYPE :
SPEC :
BODY NUMBER :
FIRST REGISTERED DATE :
TRAVELING DISTANCE :

[ ] FINISH     [ ] [DATA] ESTIMATION

Fig. 43

ORDER DISPLAY

[ ADDITIONAL ORDER ]

| No | CODE | NAME | QUANTITY ORDERED | ORDERED DATE | DELIVERY DATE |
|---|---|---|---|---|---|
| 0001 | 11111111 | DOOR MIRROR (R) | 1 | 06. 03. 20. | 06. 04. 22. |
| 0002 | 22222222 | DOOR GLASS (R) | 1 | | |

(1/1)

FINISH    BEFORE PAGE   NEXT PAGE    SEARCH

Fig.44

DELIVERED PARTS DISPLAY

ADDITIONAL ORDER

LIST

| No | CODE | NAME | QUANTITY | PRICE | DELIVERY DATE | PAY DATE |
|---|---|---|---|---|---|---|
| 0001 | 11111111 | DOOR MIRROR (R) | 1 | X.XXX | 06.03.22 | 06.03.23 |

(1/1)

FINISH  DELIVERED  UNDELIVERED  BEFORE PAGE  NEXT PAGE  SEARCH

Fig. 46

SALES MANAGEMENT MENUE DISPLAY

SALES MANAGEMENT

◇ SALE BY SALESMAN
◇ SERVICE CHARGE
◇ SALE/MONTH

◇ FINISH

Fig.48

SERVICE EXPENSE DISPLAY

SERVICE EXPENSE

| NUMBER | PRICE | EXPENSE | WORK CHARGE | TAX | TOTAL |
|---|---|---|---|---|---|
| 00000001 | 5.500 | 13.000 | 10.000 | 355 | 29.355 |
| TOTAL | | | | | 29.355 |

(1／1)

FINISH  BEFORE PAGE  NEXT PAGE  PRINT

Fig. 50

REGISTERED SALESMAN DISPLAY

| REGISTERED SALESMAN | |
|---|---|

(1/1)

| No | NUMBER | NAME |
|---|---|---|
| 0001 | 1111111111 | FUJI TORU |
| 0002 | — | |

FINISH  BEFORE PAGE  NEXT PAGE  SEARCH

CUSTOMER DATA PROCESSING SYSTEM PROVIDED IN A SHOWROOM

BACKGROUND OF THE INVENTION

1. Field of the Invention

The present invention relates to a customer data processing system provided in a shop, for example, a car showroom. The present invention is advantageous for quick sales of goods desired by a customer. After the customer answers a questionnaire, a salesman estimates the total price of the desired goods, and a serviceman estimates the service cost when the customer requires service to goods. These processes are displayed on a screen and performed through a host computer as explained below.

2. Description of the Related Art

In general, a typical car showroom has three structural spaces, i.e., the showroom itself, an office and a service (including repair) area. Particularly, in the showroom, a salesman interviews a customer so that he can gather directly important sales information from the customer. Accordingly, the showroom has very important role as a customer information source. For example, the following works are performed in the showroom, i.e., collection of the questionnaire sheet from the customer, preparation of a price estimation sheet, preparation of a service estimation sheet, sales guide for new car, various incentives for sales, etc.

In this case, an effective performance is always required from the salesman and the serviceman in order not to lose a sales or service opportunity. From this view point, it is required to perform a systematic management of various sales data, for example, prices, taxes, stock, customer data, etc.

SUMMARY OF THE INVENTION

The object of the present invention is to provide a customer data processing system enabling effective management of sales and service data gathered from customers and enabling quick sales of goods and services desired by the customer.

In accordance with the present invention, there is provided a customer data processing system provided in a shop, the system including:

a sales terminal having an input unit for inputting customer data, such as name, address, desired goods, etc., which are obtained by answers from a customer, in accordance with messages displayed on a screen; and an office terminal connected to the sales terminal through a transmission line and having a data registering unit and a customer data storage unit to sort the answers for each customer and to register sorted answers into the data registering unit.

In a preferred embodiment, the input unit includes a handwriting input unit on which the customer writes data such as name, address, the desired goods, etc., in each input area displayed on the screen.

In another preferred embodiment, the sales terminal further includes a goods data storage unit for registering the answers and price data for the goods, and a goods estimating unit for generating a goods estimating sheet based on the price data for the goods.

In still another preferred embodiment, the sales terminal further includes an assessed data storage unit for storing assessed prices based on kinds of trade-in goods, and the goods estimating unit prepares the goods estimating sheet based on the assessed prices.

In still another preferred embodiment, the goods estimating unit includes a goods selecting unit for selecting goods having prices in a range of an estimated cost provided by the customer.

In accordance with another aspect of the present invention, the customer data processing system includes: a factory terminal; an office terminal connected to the factory terminal through a transmission line; and a host computer connected to the office terminal.

The factory terminal includes: a parts image data storage unit for registering service parts data for goods in the form of image data; an image display unit for reading images of service parts from the parts image data storage unit and displaying the images of goods on a screen; and a parts input unit for detecting selection of the images of goods designated in the displayed images of goods, and applying service parts codes which correspond to the selected service parts.

The office terminal includes: a parts data storage unit for registering service parts prices for goods, and a service estimating unit connected to the parts data storage unit for preparing a service estimating sheet for the desired goods based on the service parts prices.

In still another preferred embodiment, the office terminal further includes a stock managing unit for managing a stock of service parts, and an order unit for ordering the desired service parts from the host computer when there are no stock of service parts, wherein the service estimating unit prepares the service estimation sheet by filling a completion day of service in the service estimating sheet based on delivery date of the service parts reported by the host computer.

In still another preferred embodiment, the office terminal further includes another parts image data storage unit which is the same as the unit provided in the factory terminal, and wherein, when displaying the service parts image in the factory terminal, the image display unit displays the service parts image which is read from the another parts image data storage unit in the office terminal.

BRIEF EXPLANATION OF THE DRAWINGS

In the drawings:

FIG. 6 is a detailed block diagram of a portable terminal shown in FIG. 3;

FIG. 10 is a process flowchart for estimation of a new car;

FIG. 11 is a process flowchart for search of a catalog;

FIG. 14 is a process flowchart when a customer visits a car showroom in a conventional art;

FIG. 16 is a process flowchart for preparation of the service estimation sheet in the conventional art;

FIG. 17 shows one example of a menu display in the customer terminal;

FIG. 18 shows one example of a questionnaire display;

FIG. 21 shows a second example of the estimation sheet display:

FIG. 22 shows a third example of the estimation sheet display;

FIG. 23 shows a fourth example of the estimation sheet display;

FIG. 25 shows another example of the catalog display;

FIG. 28 shows one example of a service estimation display;

FIG. 29 shows another example of the service estimation display;

FIG. 30 shows one example of a parts display;

FIG. 31 shows another example of the parts display;

FIG. 32 shows one example of an expense display;

FIG. 33 shows one example of the service estimation display;

FIG. 36 shows one example of an editing display;

FIG. 38 shows one example of the new car estimation display;

FIG. 39 shows one example of the service estimation list display;

FIG. 40 shows one example of the service estimation sheet display;

FIG. 41 shows one example of the service estimation data display;

FIG. 43 shows one example of an order display;

FIG. 44 shows one example of a delivered parts display;

FIG. 46 shows one example of a sales management display;

FIG. 48 shows one example of the service expense display;

FIG. 50 shows one example of a registered salesman display.

DESCRIPTION OF THE PREFERRED EMBODIMENTS

Before explaining the preferred embodiments, one example of a conventional process to prepare customer data, and its problems, will be explained in detail below.

FIG. 14 is a process flowchart of when a customer visits the car showroom. Briefly, a customer fills in his name, a type of (or kind of) car, a price range, etc., in the questionnaire sheet, and the salesman inputs above data from the questionnaire sheet to a personal computer in order to register them in a customer file.

In detail, in steps S81 and S82, the salesman hands over the questionnaire to the customer, and the customer answers the salesman's questions on the questionnaire sheet. In steps S83 and S84, the salesman checks the contents of the questionnaire sheet and hands over a catalog of a car which satisfies the customer's requirement. In step S85, the customer checks the catalog.

After above steps, in steps S86 and S87, the salesman prepares the price estimation of the car, and hands it over to the customer.

Further, after the customer leaves with the price estimation sheet, in steps S88 and S89, an office worker inputs the contents of the questionnaire sheet and the price estimation into the personal computer.

Figure 15A:
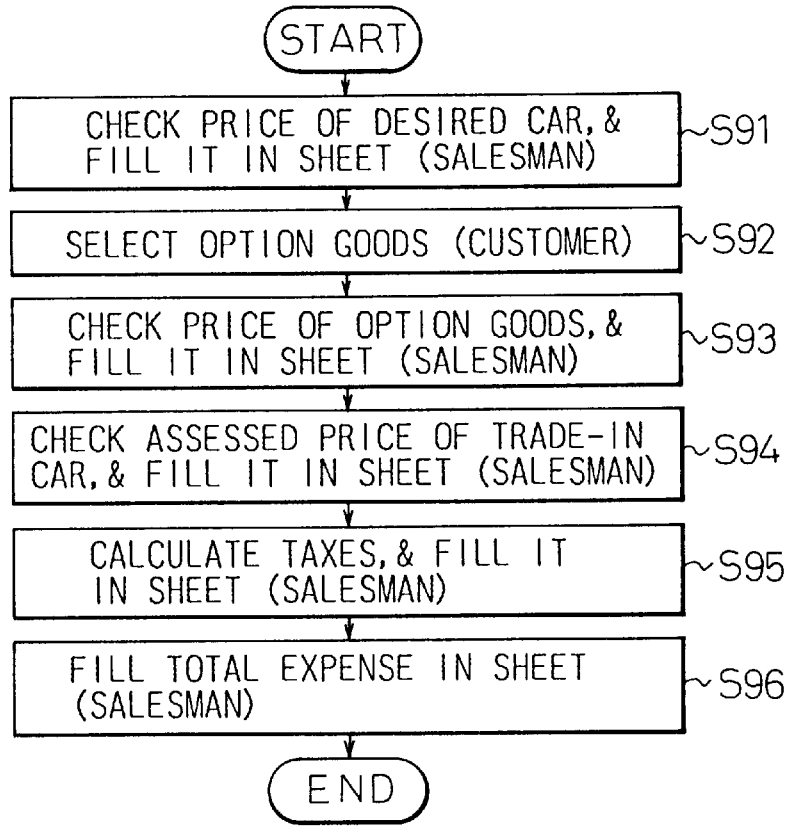
FIG. 15A is a process flowchart for preparation of the estimation sheet of the new car in the conventional art.
Figure 15B:
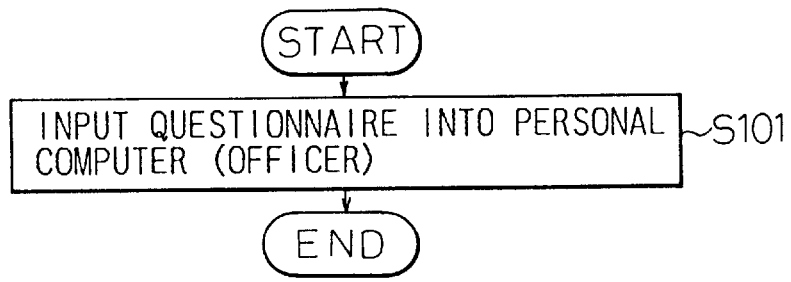
FIG. 15B is a process flowchart for input of the questionnaire in the conventional art.
Figure 15C:
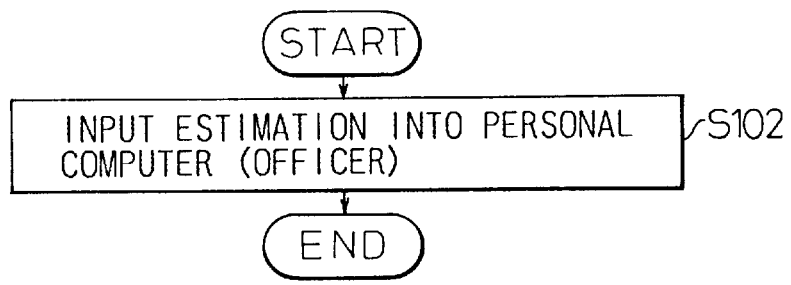
FIG. 15C is a process flowchart for input of the estimation in the conventional art.
Figure 19:
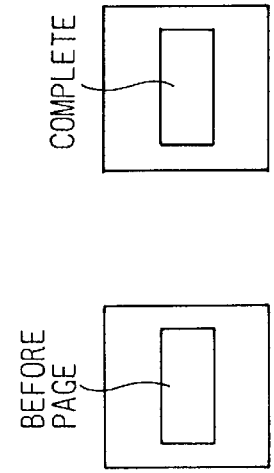
FIG. 19 shows another example of the questionnaire display.

FIG. 15A is a process flowchart for the preparation of the estimation sheet of a new car. FIG. 15B is a process flowchart for input of the questionnaire and FIG. 15C is a process flowchart for input of the estimation.

In FIG. 15A, in step S91, the salesman checks the price of the new car selected by the customer and fills in the price in the estimation sheet. In step S92, the customer selects optional goods. In step S93, the salesman checks the price of the optional goods and fills in the price in the estimation. In step S94, the salesman checks an assessed price of a trade-in goods and fills the assessed price in the estimation. In step S95, the salesman calculates various taxes, for example, a weight tax, a consumption tax, and fills them in the estimation sheet. In step S96, the salesman calculates a total price of the new car and fills it in the estimation sheet so that the estimation sheet is completed.

In FIG. 15B, in step S101, the office worker inputs the contents of the questionnaire sheet into the personal computer. This step corresponds to the step S88 of FIG. 14. Further, in FIG. 15C, in step S102, the office worker inputs the contents of the estimation sheet into the personal computer. This step corresponds to the step S89 of FIG. 14.

FIG. 16 is a process flowchart for preparation of the service estimation sheet. In a car showroom having a service station, a serviceman prepares a service estimation. In step S111, the serviceman receives a service request slip from the customer. In steps S112, S113 and S114, the serviceman searches a work sheet corresponding to a type of the car to be serviced, and fills the contents to be serviced in the work sheet so that the service estimation is completed. After completion of above steps, in steps S115 and S116, the serviceman inputs the contents of the work sheet, for example, part codes, service procedures, etc., into the personal computer, and calculates the service price. After the above steps, the formal service estimation is printed out. In the above steps, if the stock state of the service parts is not clear, the serviceman cannot give the date of completion of the service to the customer.

In the above conventional art, a lot of time and work are required for preparing the price estimation and service estimations so that many mistakes occur. This is because all data, for example, customer data, price data, service data, etc., are not performed based on systematical management. Further, the level of the salesman, i.e., a skilled salesman or an unskilled salesman, influences the result of sales and service effects.

Figure 1:
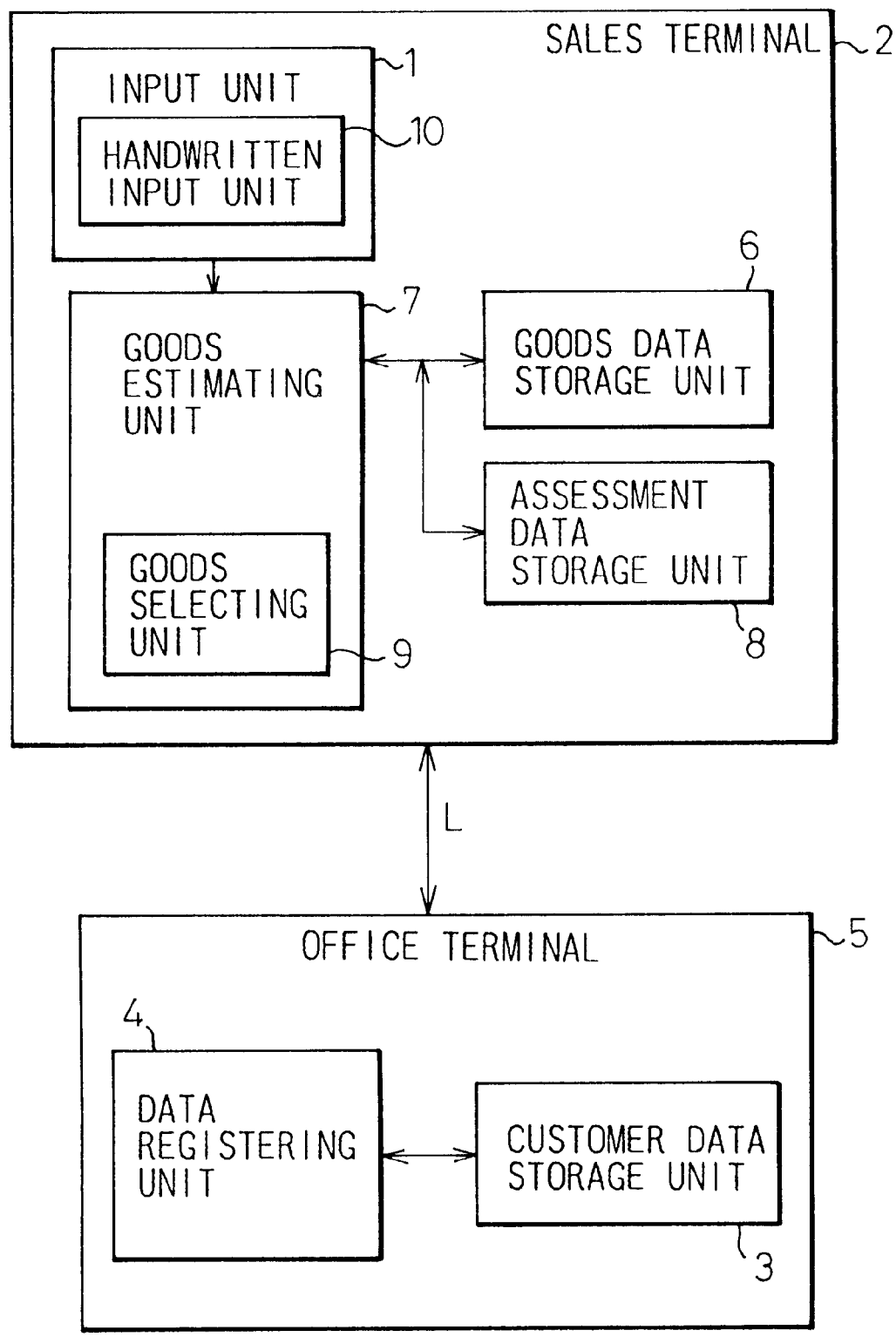
FIG. 1 is a first basic structure of a customer data processing system according to the present invention.

FIG. 1 is a first basic structure of the customer data processing system according to the present invention.

In the first embodiment, the customer data processing system includes a sales terminal 2 having an input unit 1 for inputting customer data, such as name, address, goods, etc., which can be obtained based on the customer's answers, in accordance with messages displayed on a screen; and an office terminal 5 connected to the sales terminal 2 through a transmission line L and having a data registering unit 4 and a customer data storage unit 3.

In the second embodiment, the input unit 1 includes a handwriting input unit 10 on which the customer writes, for example, name, address, goods, etc., in each displayed input column. For example, the handwriting input unit 10 is a light pen.

In the third embodiment, the sales terminal 2 further includes a goods data storage unit 6 for receiving answers from the customer data storage unit 3 and registering the price data for goods based on answers, and a goods estimating unit 7 for preparing a goods estimating sheet based on the price data for the goods.

In the fourth embodiment, the sales terminal 2 further includes an assessed data storage unit 8 for storing assessed prices determined based on the trade-in data of a used car. The goods estimating unit 7 prepares the goods estimating sheet based on the trade-in price which is read out from the assessed data storage unit 8.

In the fifth embodiment, the goods estimating unit 7 includes a goods selecting unit 9 for selecting goods having a price in the range of the customer's estimated cost.

Figure 2:
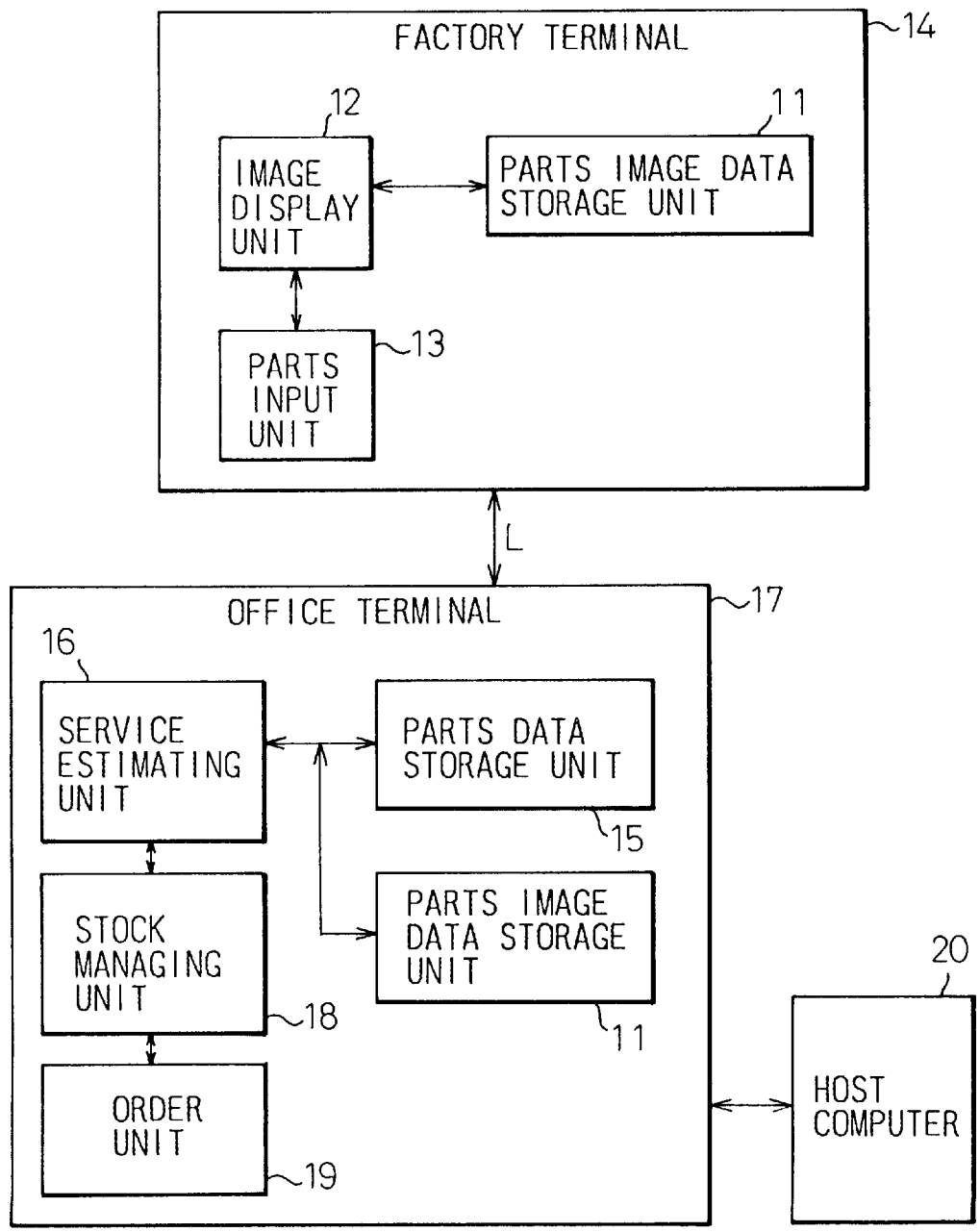
FIG. 2 is a second basic structure of the customer data processing system according to the present invention.

FIG. 2 is a second basic structure of the customer data processing system according to the present invention.

In the sixth embodiment, the customer data processing system includes a factory terminal 14 and an office terminal 17 connected to the factory terminal 14 through the transmission line L. The office terminal 17 is further connected to a host computer 20.

The factory terminal 14 includes: a parts image data storage unit 11 for registering each service parts data of goods in the form of an image data; an image display unit 12 for displaying the images of goods; and a parts input unit 13 for detecting the images of goods, which are designated by the serviceman, and applying parts codes which correspond to the selected service parts.

The office terminal 17 includes a parts data storage unit 15 for registering prices of service parts, and a service estimating unit 16 connected to the parts data storage unit 15 for preparing the service estimating sheet of goods based on the parts prices which are read out from the parts storage data storage unit 15.

In the seventh embodiment, the office terminal 17 further includes a stock managing unit 18 for managing stock of service parts, and an order unit 19 for ordering the desired service parts from the host computer 20 when there is no stock of service parts. The service estimating unit 16 prepares the service estimation sheet by filling the completion day of the service in the sheet based on the delivery date of the parts provided by the host computer.

In the eighth embodiment, the office terminal 17 further includes the parts image data storage unit 11 which is the same unit as provided in the factory terminal 14. When displaying the service parts images in the factory terminal 14, the image display unit 12 displays the service parts images which are read out from the parts image data storage unit 11 in the office terminal 17.

Figure 3:
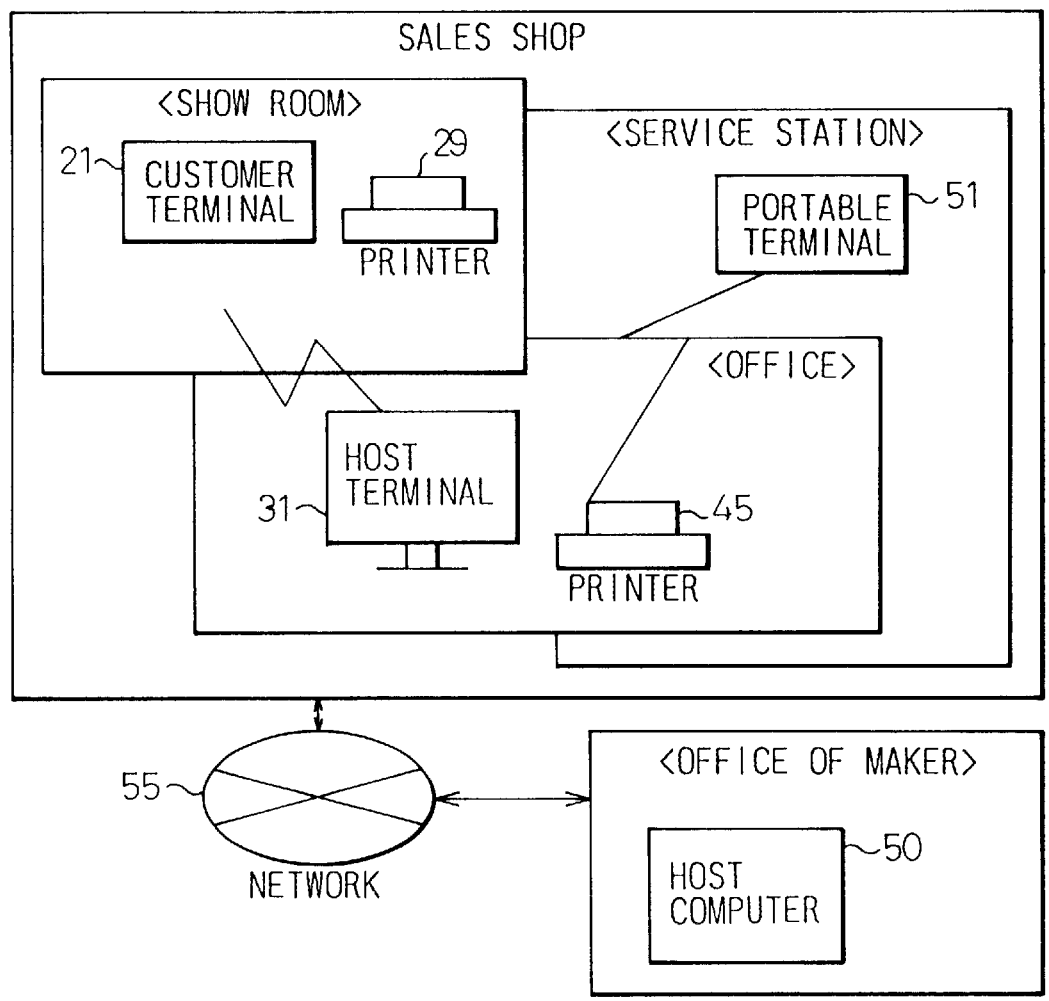
FIG. 3 is a whole block diagram of the customer data processing system provided in a car showroom.

FIG. 3 is a whole block diagram of the customer data processing system provided in the car showroom. The car shop is separated in three areas, i.e., the showroom itself, an office and a service station. The showroom includes a customer terminal 21 (this corresponds to the sales terminal 2 in FIG. 1), the service station includes a portable terminal 51 (this corresponds to the factory terminal 14 in FIG. 2), and the office room includes a host terminal 31 (this corresponds to the office terminal 5, 17). Further, the host terminal 31 is connected to the host computer 50 in the office of the car maker through a network 55.

The showroom further includes a printer 29, and the office room further includes the printer 45.

The host terminal 31 and the customer terminal 21 are connected each other through a wire communication method (it may be possible to utilize a wireless method), and the host terminal 31 and the portable terminal 51 are connected each other through a wireless communication method (it may be possible to utilize the wire method).

Figure 4:
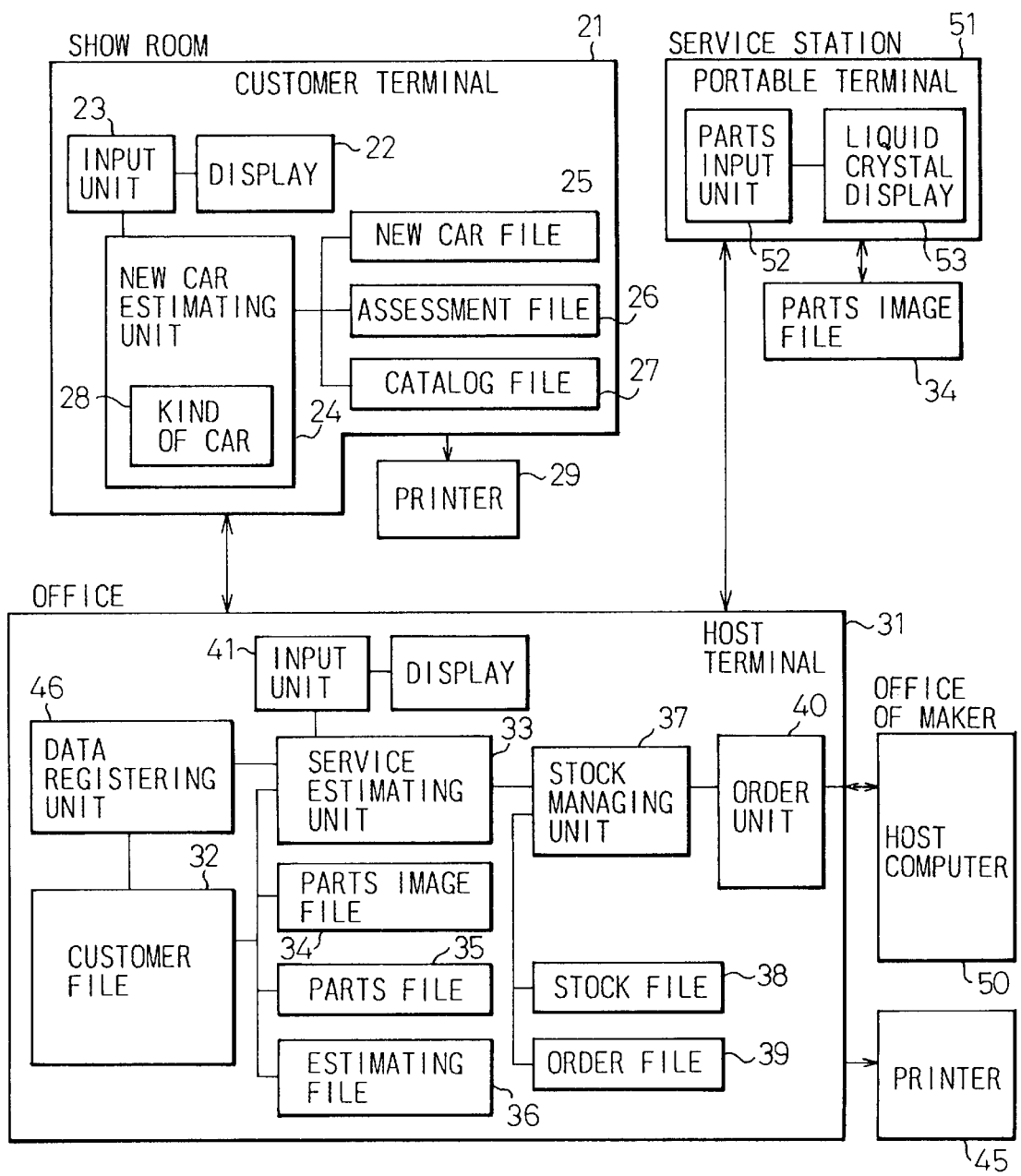
FIG. 4 is a detailed block diagram of the customer data processing system shown in FIG. 3.
Figure 5:
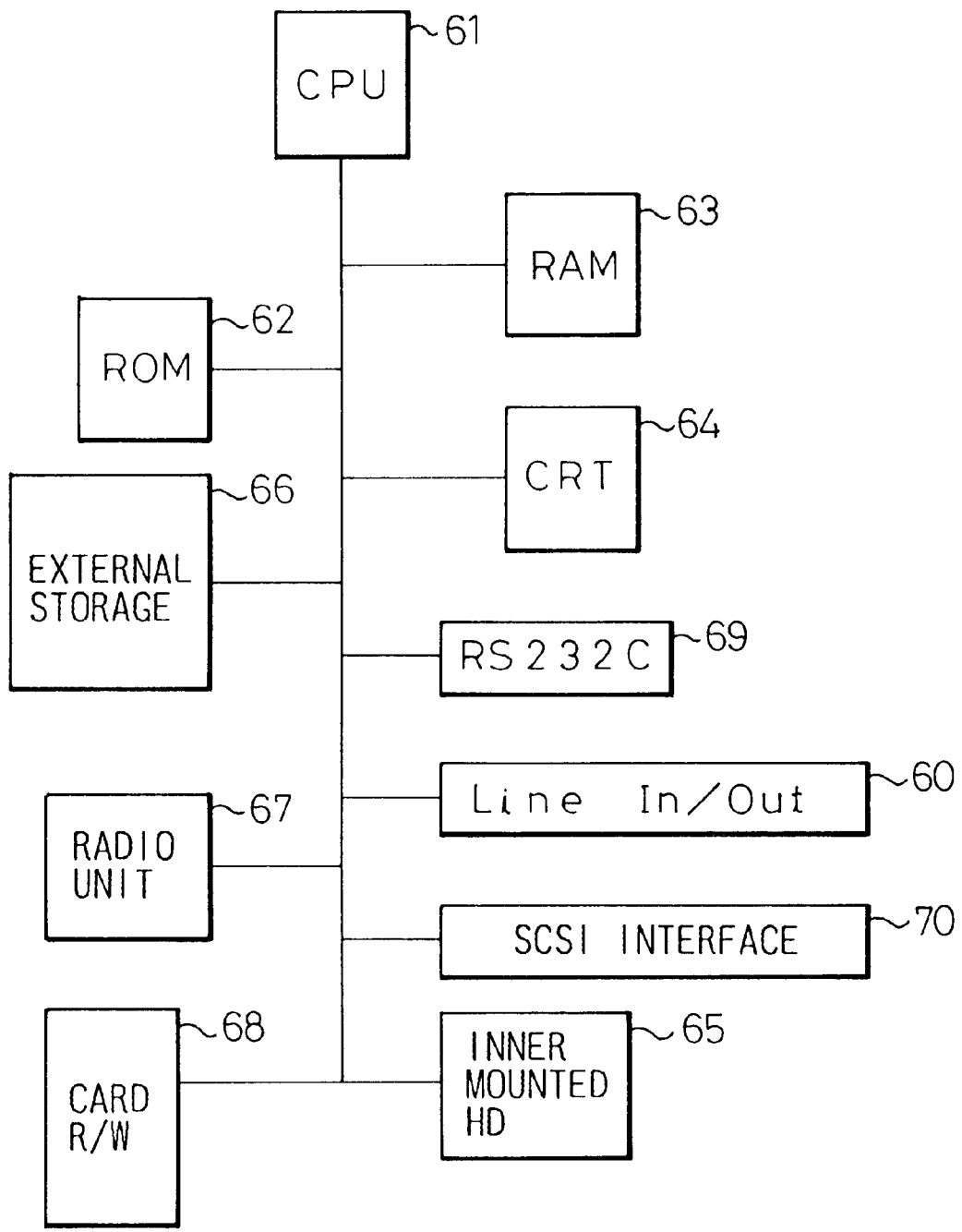
FIG. 5 is a detailed block diagram of a customer terminal and a host terminal shown in FIG. 3.
Figure 7A:
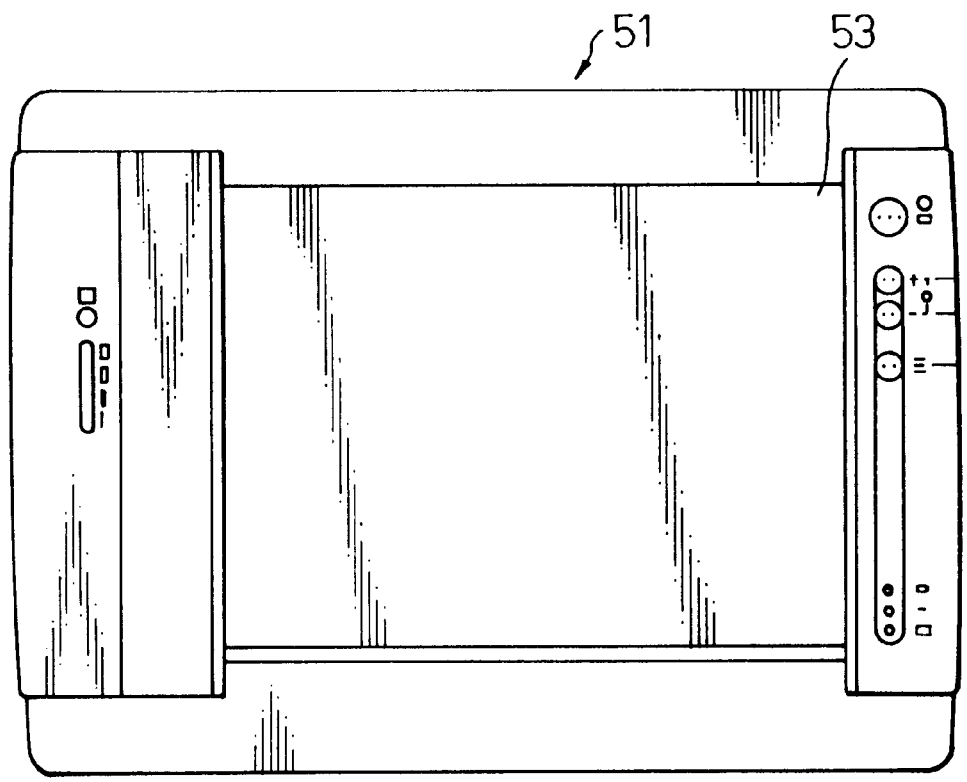
FIGS. 7A and 7B are outer views of the portable terminal shown in FIG. 3.
Figure 7B:
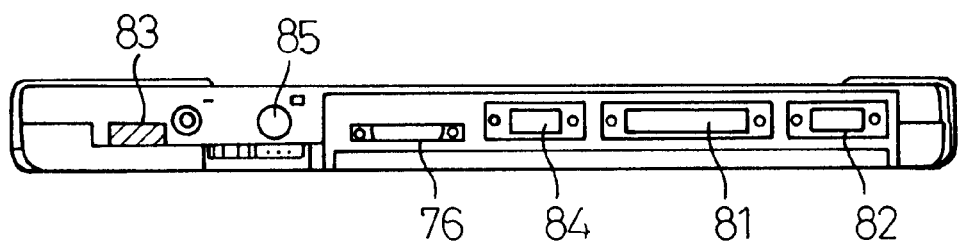

FIG. 4 is a detailed block diagram of the customer data processing system shown in FIG. 3, FIG. 5 is a detailed block diagram of the customer terminal and the host terminal shown in FIG. 3, and FIG. 6 is a detailed block diagram of the portable terminal shown in FIG. 3. Further, FIGS. 7A and 7B are outer views of the portable terminal shown in FIG. 3.

In FIG. 4, the customer terminal 21 includes: a display unit 21 for displaying the contents of the questionnaire; an input unit 23 for inputting the answers to of the questionnaire by using the light pen; a new car estimating unit 24 for preparing the estimation sheet of the new car; a new car file 25 for storing the price data and the option data for new cars; an assessment file 26 for defining the trade-in price based on the type and year of the trade-in vehicle; a catalog file 27 for storing catalog data for the new car; and a kind of car selecting unit 28 for selecting the kind of car in the range of the customer estimated cost. Further, the customer terminal 21 is connected to the printer 29.

The host terminal 31 includes an input unit 41, a display unit 42, a service estimating unit 33 for preparing the service estimating sheet for the service expense for the car to be served, a stock managing unit 37 for processing the stock data of the service parts, and an order unit 40 for ordering the service parts to the host computer 50. Further, the host terminal 31 is connected to the printer 45.

Further, the host terminal 31 includes a customer file 32 for storing customer data and questionnaire data, a parts image file 34 for storing code data and image data, a parts file 35 for storing the price data for each parts, an estimating file 36 for storing the estimating data to be filled in the sheet, a stock file 38 for storing the stock data of parts, and an order file 39 for storing the parts name to be ordered and the number of parts.

The portable terminal 51 includes a parts input unit 52 for inputting necessary service parts, and a liquid crystal display 53 for displaying the images of parts. Further, the portable terminal can directly read the contents of the parts image file 34 which is stored in the CD-ROM 79.

In FIG. 5, reference number 61 denotes a central processing unit (CPU), 62 a read only memory (ROM), 63 a random access memory (RAM), 64 a display (CRT), 65 an inner mounted hard disk (HD), 66 an external storage, 67 a radio unit, 68 a card reader/writer (CARD R/W), 69 an interface (RS232C), 70 another interface (SCSI), and 60 still another interface (LINE IN/OUT).

In FIG. 6, reference number 71 denotes a central processing unit (CPU), 72 a read only memory (ROM), 73 a random access memory (RAM), 75 a card type 1.8 inch HD, 76 an external 3.5 inch FD interface, 77 a barcode reader, 78 an optical disk (MO), 79 a CD-ROM, 80 a card reader/writer, 81 a parallel interface, 82 a serial interface, 83 an optical interface, and 84 a CRT interface. Reference number 53 is the liquid crystal display with a FL backlight shown in FIG. 7A and the customer can input data by using the light pen. The portable terminal 51 can be connected to the barcode reader 77, the optical disk (MO) 78, the CD-ROM 79 and the card reader/writer 82.

Figure 8:
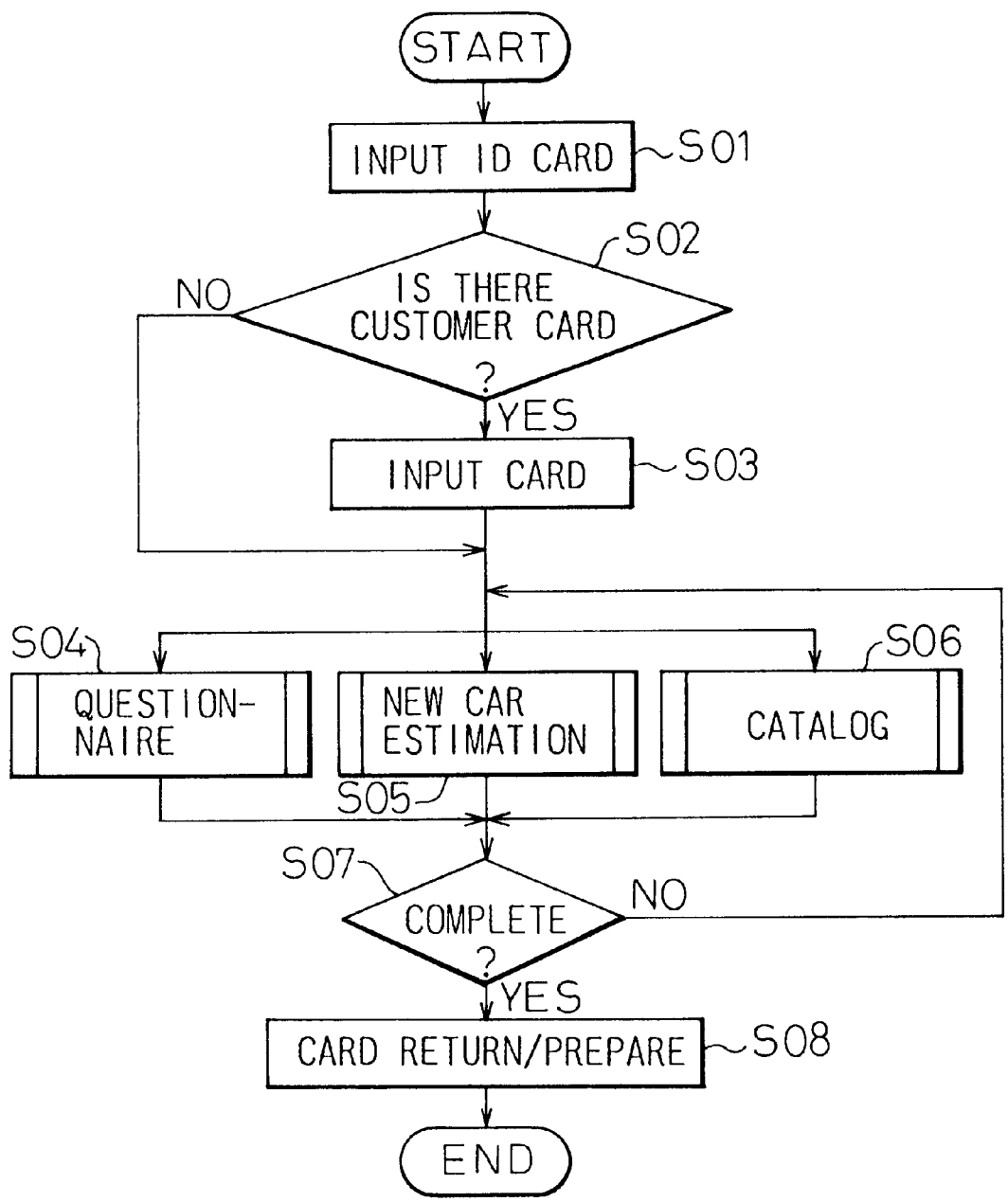
FIG. 8 is a process flowchart in a showroom in FIG. 3.

FIG. 8 is a process flowchart for the showroom system in FIG. 3.

When a customer visits a car showroom, first, the salesman asks the customer to fill his requirements in the questionnaire sheet by using the customer terminal 21. Before this procedure, an ID card for the salesman is entered in the card reader/writer 68, which is connected to the customer terminal 21, in order to recognize the salesman himself. The contents of the ID card are queried by the host terminal 31 in order to confirm the salesman (step S01).

Next, the salesman checks whether the customer card is registered in the host computer. When his card is already registered (YES), the card is input from the customer terminal 21 (steps S02, 03). In the customer terminal 21, the menu to be selected by the customer is displayed on the screen as shown in FIG. 17. That is, there are three menus, "questionnaire" for obtaining the questionnaire from the customer (step S04), "new car estimation" for estimating the cost to buy the new car (step S05), and "catalog" for displaying the information concerning the new car (step S06).

Next, the salesman checks whether any one of above processes is finished (step S07). When the process is finished (YES), the customer card is returned to the customer (step S08). Further, for a new customer, a new card for the new customer is prepared and registered in the host computer in accordance with the questionnaire (step S08).

Figure 9A:
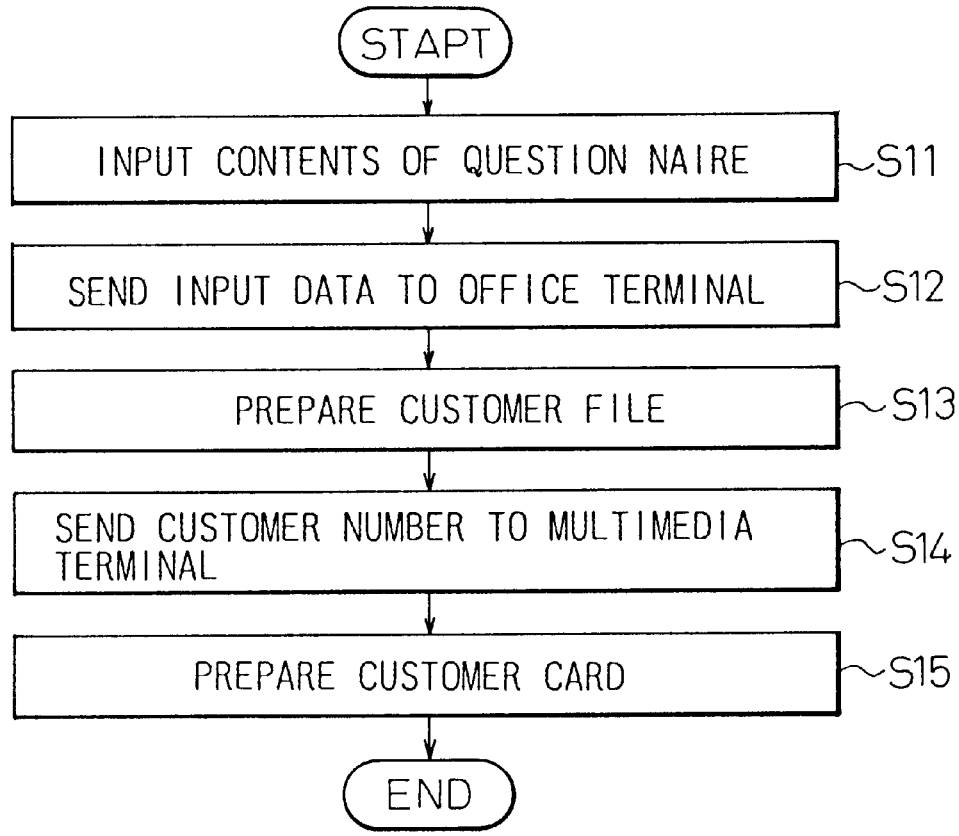
FIG. 9A is a process flowchart for a questionnaire sheet.
Figure 9B:
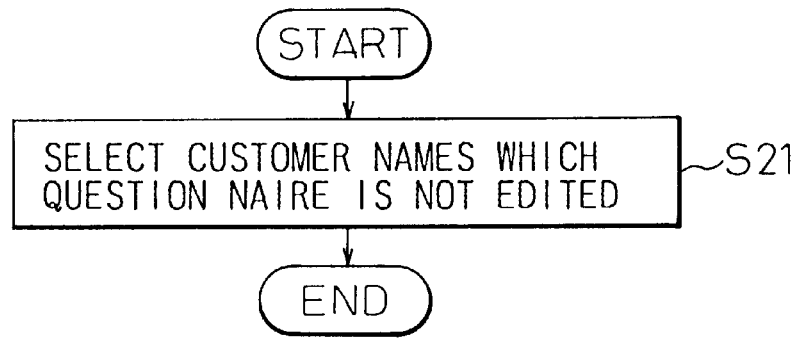
FIG. 9B is a process flowchart for a questionnaire edition.

FIG. 9A is a process flowchart for the questionnaire sheet, and FIG. 9B is a process flowchart for the questionnaire edition. A process to input the contents of the questionnaire is executed in the customer terminal 21. That is, the customer inputs the contents of the questionnaire which is displayed on the screen 22, for example, address, name, the estimated cost, the type of the car, etc., by using the light pen (step S11). The data input by the customer (image data, character code, code data) are sent to the host terminal 31 in the office (step S12).

In this case, the address, the name, the estimated cost provided by the customer, the type of car, etc., are usually input by the image. However, in order to avoid various errors, for example, misreading, in the image data input operation, the image data are not displayed on the customer terminal 21 and sent to the host terminal 31 with the character codes.

On the other hand, when it is necessary to recognize the address, the name, etc., through the image data, the recognition is processed based at a low priority in the customer terminal 21.

The contents of the estimation sheet is displayed on the screen as shown in FIGS. 20 to 23. As shown in these drawings, the customer can select desired options from many items so that it is easy to satisfy his requirements for the new car.

Further, in the host terminal 31, the data registering unit 46 registers the customer data. When there no customer data is registered, the data registering unit 46 judges that he is a new customer, and prepares a new customer number and registers it in the customer file 32 (step S13). The questionnaire data and others are sorted and registered for each customer in the customer file 32.

A result of the questionnaire is registered in the customer file 32 (as explained above, when the result is input by the image data, the content is registered by the character code), and other minor information are registered in a questionnaire data file (not shown) which is relevant to the customer file 32.

When the new customer number is prepared in the host terminal 31, the new customer number is sent to the customer terminal 21 (step S14). The customer terminal 21 prepares the new customer card, in which the customer number, visit day, etc., are written, by using the card reader 68 (step S15).

Figure 34:
FIG. 34 shows one example of an initial display.
Figure 35:
FIG. 35 shows one example of a list of customer display.

In FIG. 9B, the input data obtained from the questionnaire sheet are analyzed and edited in the host computer 31. At that time, an initial image is displayed on the screen as shown in FIG. 34. If the menu "questionnaire data edition" is selected in FIG. 34, the list of customers is displayed on the screen as shown in FIG. 35. In FIG. 35, if a customer whose questionnaire is not analyzed and edited (i.e, unfinished) is selected, the customer who corresponds to the unfinished questionnaire is selected from the customer file 32 in the host terminal 31. As shown in FIG. 36, the image data and character code of the name are shown in the upper and lower portions on the screen, and the incorrect descriptions are revised by using the input unit 41 (step S21).

As is obvious from above questionnaire process, it is not necessary to provide paper for the questionnaire, and it is possible to reduce the number of characters. Accordingly, it is possible to reduce input errors, for example, misreading of the questionnaire, in the present invention. Further, it is possible to improve operability for the customer since the image data and its character code are displayed on the upper and lower portions on the same screen.

Figure 20:
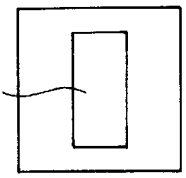
FIG. 20 shows a first example of an estimation sheet display.

FIG. 10 is a process flowchart for the estimation of the new car. The customer number is input from the customer terminal 21. In another way, the card reader/writer 68 reads the customer card, and informs the customer number to the host terminal 31. The customer data, i.e., the name, the address, etc., which corresponds to the customer number, are sent from the host terminal 31 to the customer terminal 21 (step S31). One example of the customer data is shown in FIG. 20.

Figure 24:
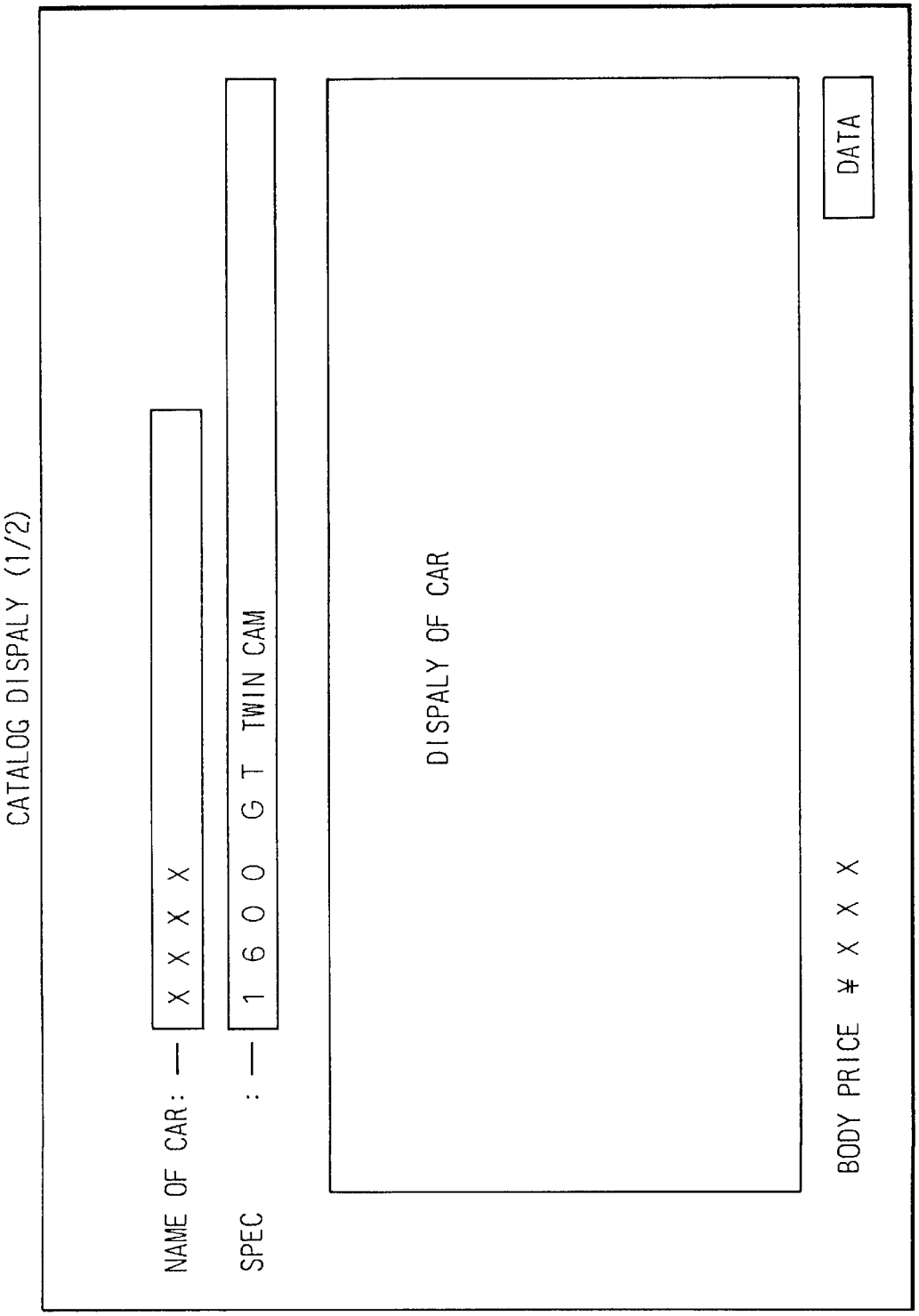
FIG. 24 shows one example of a catalog display.

Next, based on the result of the questionnaire, for example, the estimated cost, the kind (type) of the car, etc., the kind of car selecting unit 28 searches the desired car corresponding to the price range including the estimated cost in the new car file 25, and displays the list of the cars which are required by the customer in the desired price range. When the customer selects one of cars from the list, the catalog corresponding to the selected car is read from the catalog file 27 and displayed on the display unit 22 (step S32). One example of the catalog is shown in FIG. 24.

Further, the image of the options and functions for the selected car are displayed on the screen (step S33). When the customer selects the desired options, the prices of the selected car and its options are read from the new car file 25 and automatically displayed on the estimation sheet (these are stored as the estimation data). The contents of the estimation sheet are displayed as shown in FIG. 22 (step S34).

When the customer has a trade-in car, the salesman selects the type of the trade-in car. After above process, a standard assessed price for the trade-in car is read from the assessment file 26 and automatically displayed on the estimation sheet (step S35). Accordingly, it is possible for the customer to confirm the assessed price of the trade-in car through the screen (step S35). The trade-in price is shown in FIGS. 22 and 23. The various taxes, for example, the weight tax, the consumer tax, etc., are automatically calculated and displayed on the screen (step S36). Finally, the total price of the body, the option and the trade-in prices are calculated, and automatically displayed on the estimation sheet (step S37).

Figure 37:
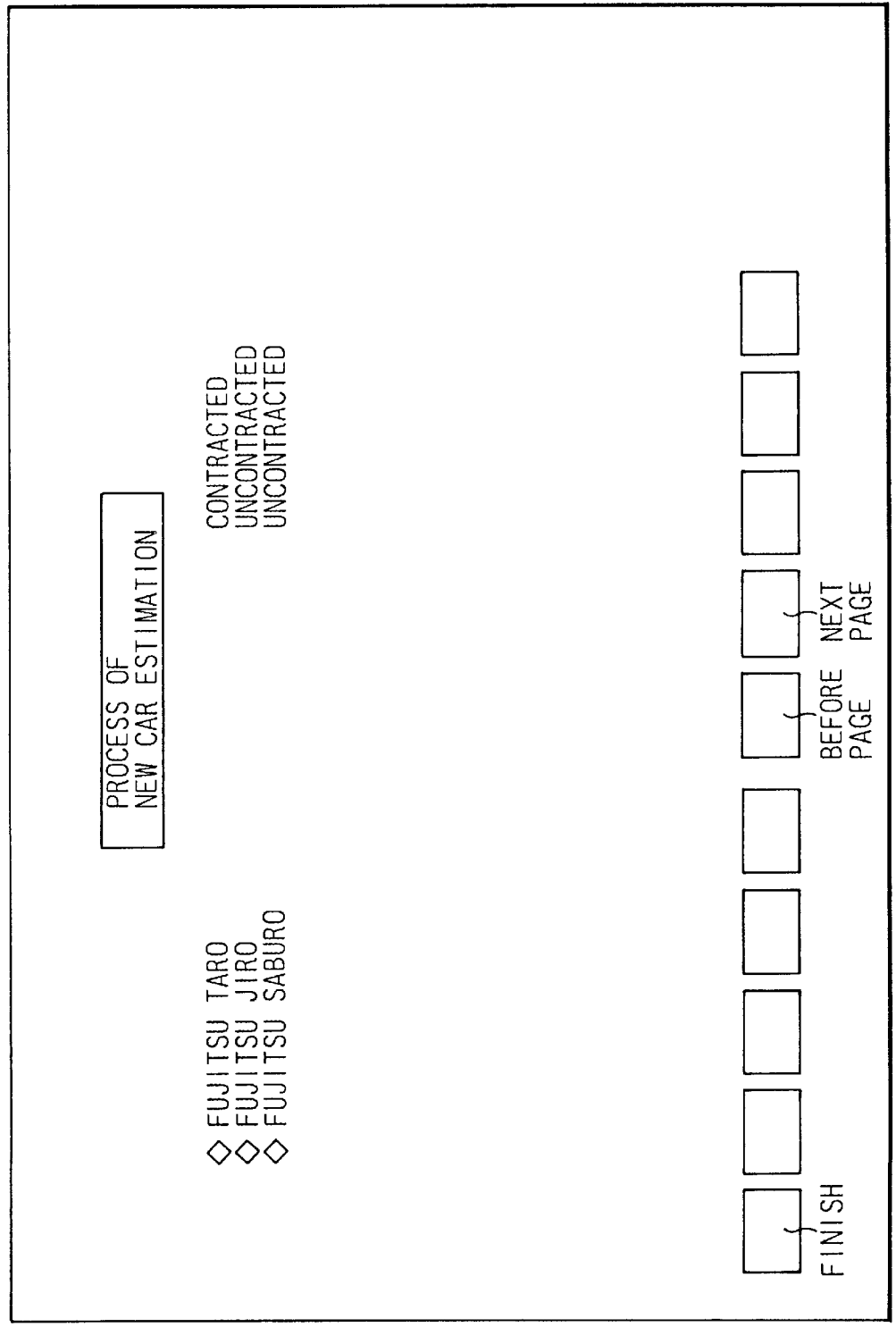
FIG. 37 shows one example of a new car estimation list display.

The result of the estimation is displayed on the screen as shown in FIGS. 37 and 38, and the salesman confirms the contents of the estimation. After confirmation by the salesman, the estimation sheet is printed. Further, the estimated data on the estimation sheet is sent to the host terminal 31 and written into the customer file 32 (step S38). The contents of the estimation sheet are displayed on the display unit 42 of the host terminal 31.

The kind of car selecting unit 28 sets the price range including the estimated cost provided by the customer. As one example, the price range is set in the range of from +10% to -10% of the estimated cost, and the kinds of the car included in this range are selected and displayed on the screen.

One example of selection of the kind of the car is done as follows. As the selection from the catalog, the catalog file is selected based on a kind (type) of car, price, etc.

In the above estimating processes, it is possible to reduce the handling of the customer for input items by utilizing the customer card, and the customer data in the host terminal 31. Further, since it is possible to automatically select the catalog which corresponds to the desired car from the price and the kind of the car in the range of the estimated cost, the salesman can objectively recommend a suitable car without any influences of subjective opinions of the salesman so that it is possible to realize uniform service from the salesman to the customer.

Further, in the above estimating processes, since the standard assessed price for the trade-in car and the weight tax and the consumer tax are automatically calculated by searching the file and the total price are also automatically calculated based on the estimation, it is possible to prevent calculation errors and descriptive errors. Further, since the estimated data are sent to the host terminal 31 and stored in the customer file 32, it is possible to collectively manage the estimated data in the host terminal 31.

FIG. 11 is a process flowchart for search of the catalog. The catalog file 27 is searched based on the list of the new car. That is, the list of new cars, which is current, is displayed on the display unit 22 in the customer terminal 21, and the customer selects the desired kind of car from the list (step S41). The catalog file 27 is searched for the selected kind of car, and the image data (including a sound guide) corresponding to the selected car is read out and displayed on the screen (step S42). One example of the display is shown in FIG. 24.

Further, if the display key for options is pushed in the customer terminal 21, the images of options are displayed on the screen as shown in FIG. 25 (step S43). Further, when the customer selects the desired options, the selected options data are used for the estimation data with the selected kind of car (step S44). Accordingly, it is possible to easily obtain the data of desired kind of car and option goods so that it is possible to smoothly prepare the estimation sheet in the new car estimating unit 24.

Figure 12:
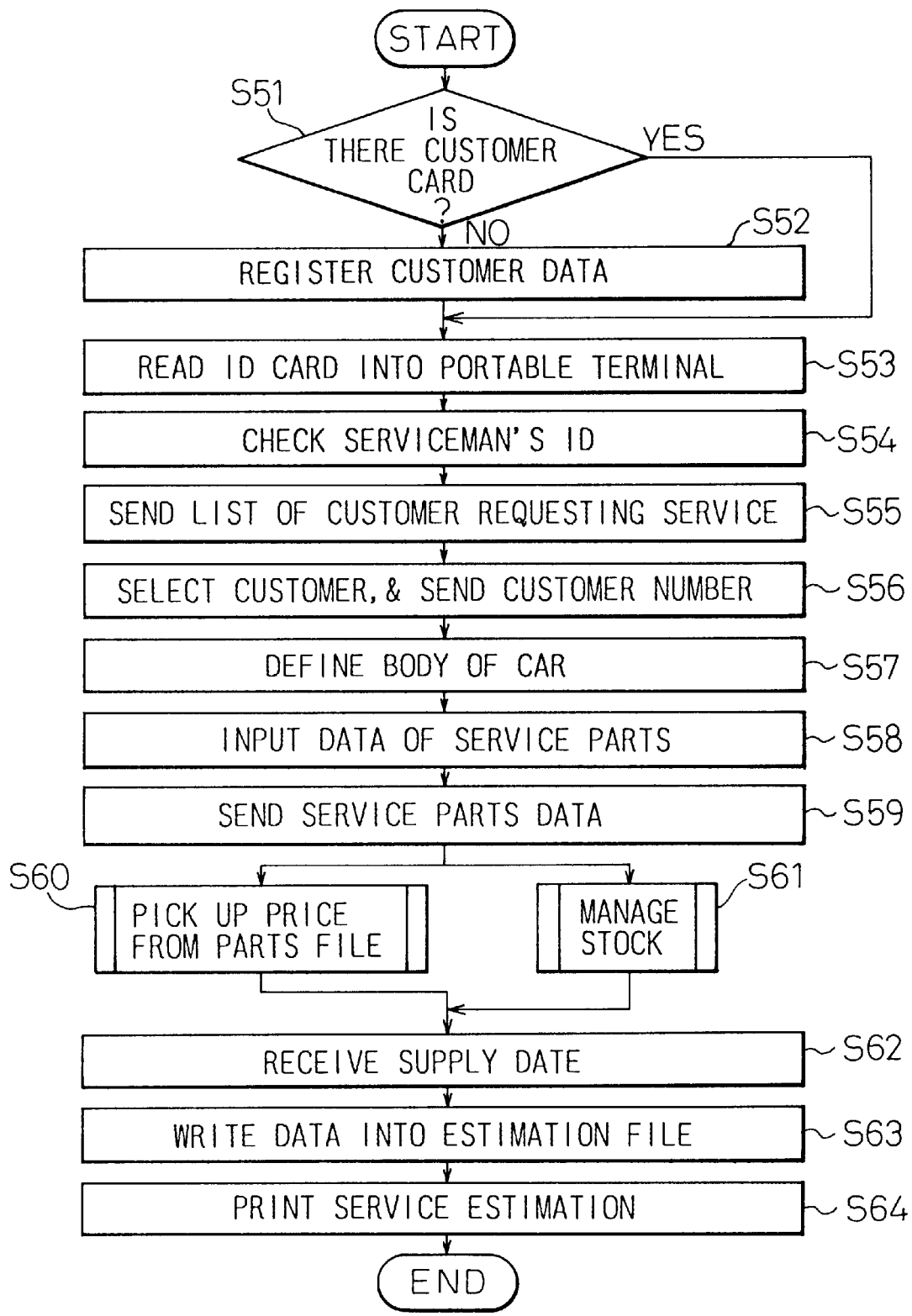
FIG. 12 is a process flowchart for a service estimation.
Figure 26:
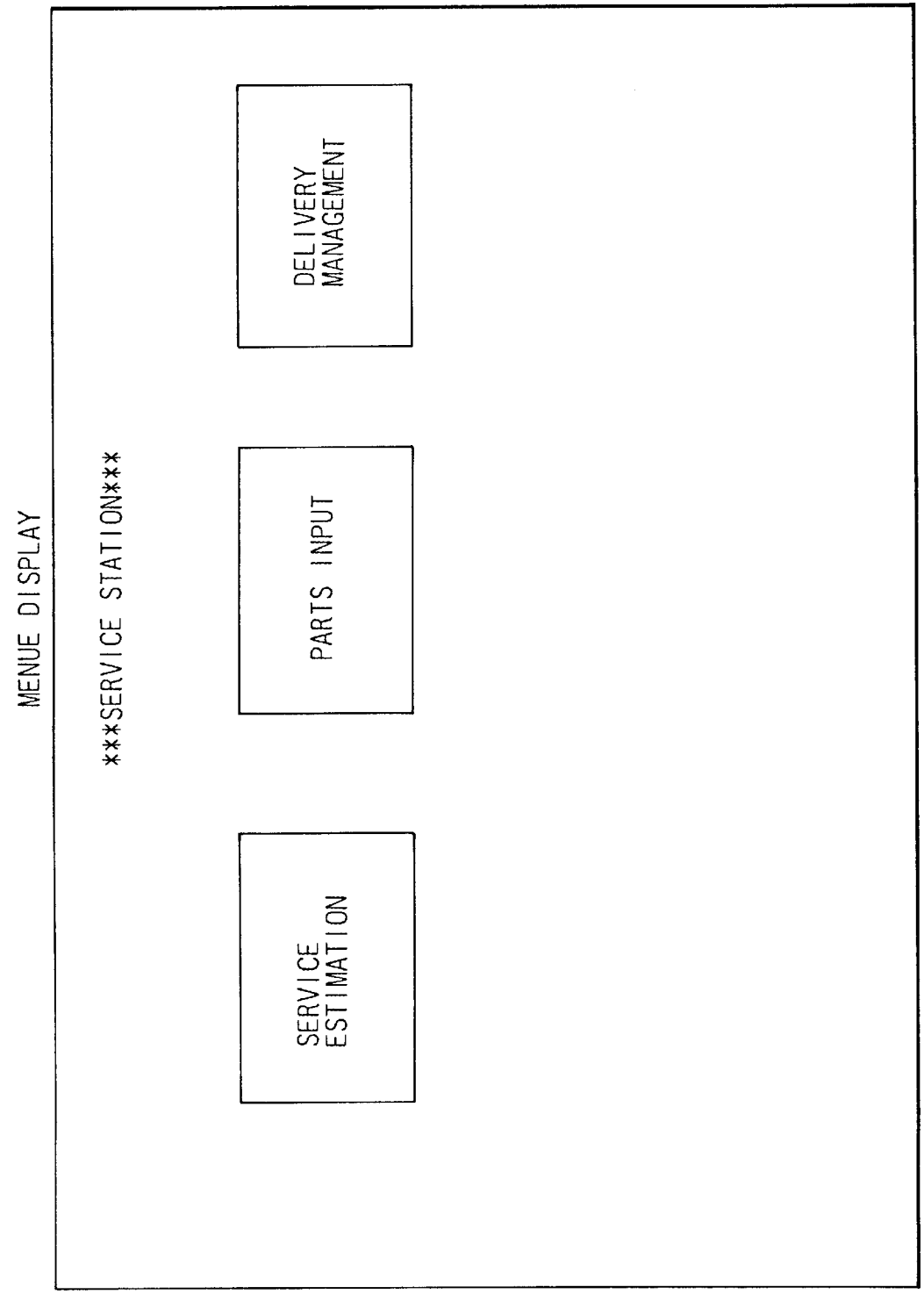
FIG. 26 shows a menu display in the factory terminal.

FIG. 12 is a process flowchart for the service estimation. The service menus are shown in FIG. 26. That is, three menus, i.e., "service estimation", "parts input" and "delivery management", are displayed on the screen. For example, when the serviceman inputs the service parts to be used, he takes the car to be serviced into the service station, and checks the body and confirms the parts to be served. Further, the serviceman inputs the service parts into the portable terminal 51.

First, the serviceman checks whether the customer card is registered (step S51). When the customer card is not registered, the serviceman registers a new customer card (name, address, kind of car, etc.,) by using the host terminal 31 in the office (step S52).

Next, the ID card for the serviceman is entered into the portable terminal 51 (step S53). The ID card is checked in the host terminal 31 (step S54). One example of the service estimation is shown in FIG. 28, and one example of registration of the salesman is shown in FIG. 50.

Figure 27:
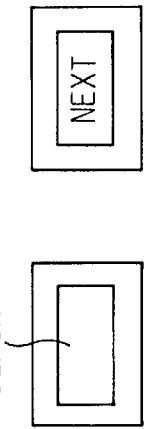
FIG. 27 shows a list of service requests display.

Next, the host terminal 31 sends the list of the service request shown in FIG. 27 to the portable terminal 51 (step S55). The serviceman selects the customer to be served by using the portable terminal 51, and the selected customer number is sent from the portable terminal 51 to the host terminal 31 (step S56). When selecting the customer, the customer card is read by the card reader/writer 68 connected to the portable terminal 51, and the customer number recorded in the card is sent to the host terminal 31.

Figure 30:
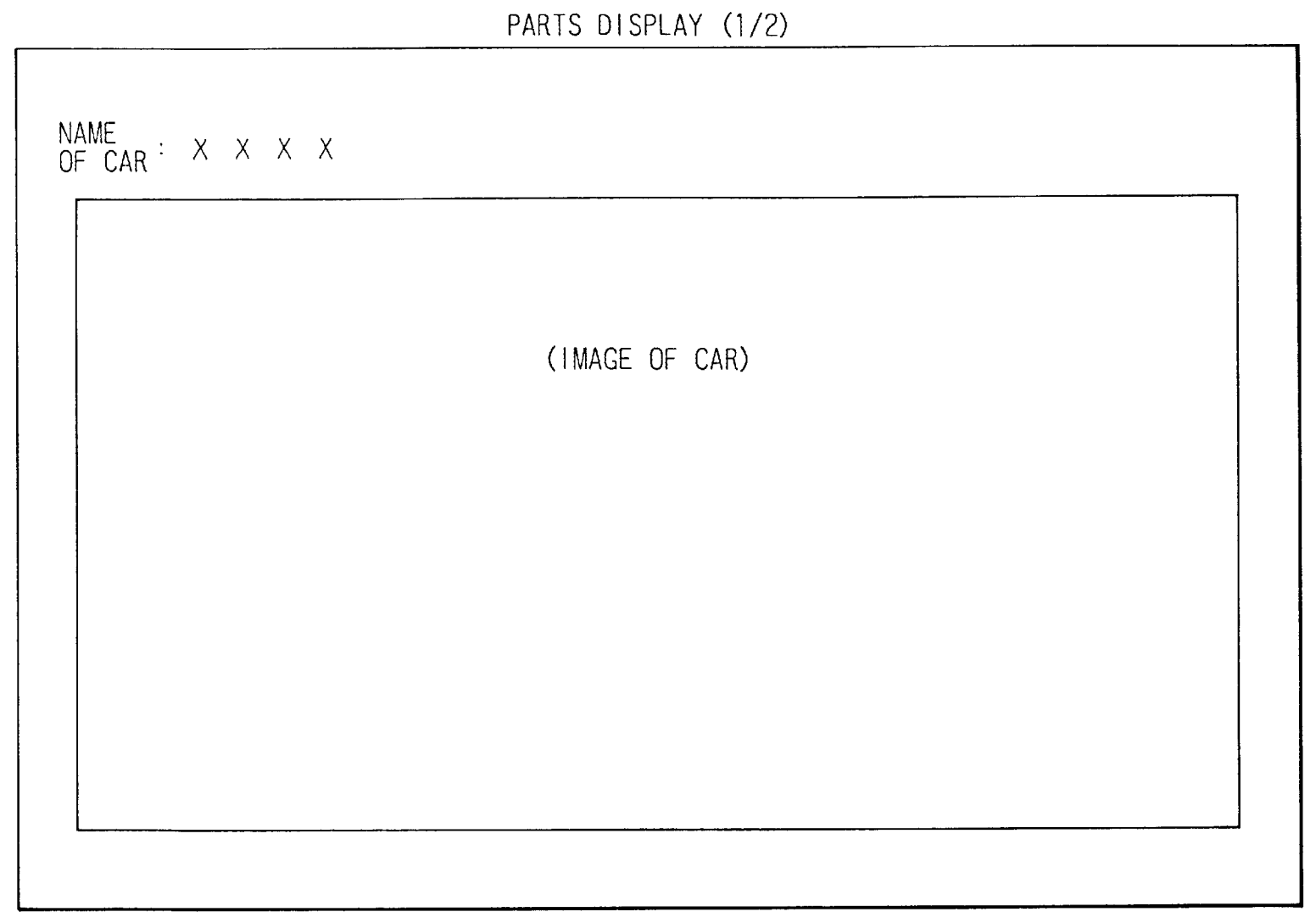

The host terminal 31 searches the customer file 32 based on the customer number; defines the body of the customer's car; reads the defined body data, its image data (see FIG. 30) and parts code/image data (see FIG. 31) from the parts image file 34; and sends these data to the portable terminal 51 (step S57). The portable terminal displays these data on the display unit 53.

As another structure, it is possible to directly connect an external storage (for example, CD-ROM, MO, etc.) to the portable terminal 51. In this case, it is possible to prepare the parts image file 34, which includes the body data and its image data, parts code and its image data, into the external storage, and to directly read out these data into the transmission line as an off-line process. In this case, it is possible to utilize the CD-ROM 79 or the optical disk (MO) 78 as the external storage. The external storage may be used as the terminal apparatus fixedly provided within the service station.

The serviceman inputs the data of service parts (for example, parts name, service method, etc.) from the portable terminal (step S58). When inputting the service parts, the serviceman designates/selects the image of the service parts, which is displayed on the display 53, using the light pen. When the serviceman finishes the input operation, the service parts data, such as codes for the selected parts and service method, are sent to the host terminal 31 in the office (step S59).

In the host terminal 31, the office worker performs the estimation by checking the display shown in FIGS. 39 and 41. The office worker searches the parts file 35, and reads out various expenses, such as prices of each service parts, the cost for mounting the service parts, etc. (step S60). Further, the stock managing unit 37 performs the stock managing process (step S61).

After the stock managing unit 37 checks the stock of the service parts and the delivery date, it sends these information to the service station 51 (step S61, S62). The office worker obtains the expense of the service parts and costs for mounting the service parts, determines the delivery date based on the parts supply day, and writes these data into the estimation file 36 (step S36). One example of the estimation is shown in FIG. 33. After the estimation file 36 is completed, the service estimation is edited based on the contents shown in FIG. 40 and printed by the printer 45 (step S64).

Figure 13:
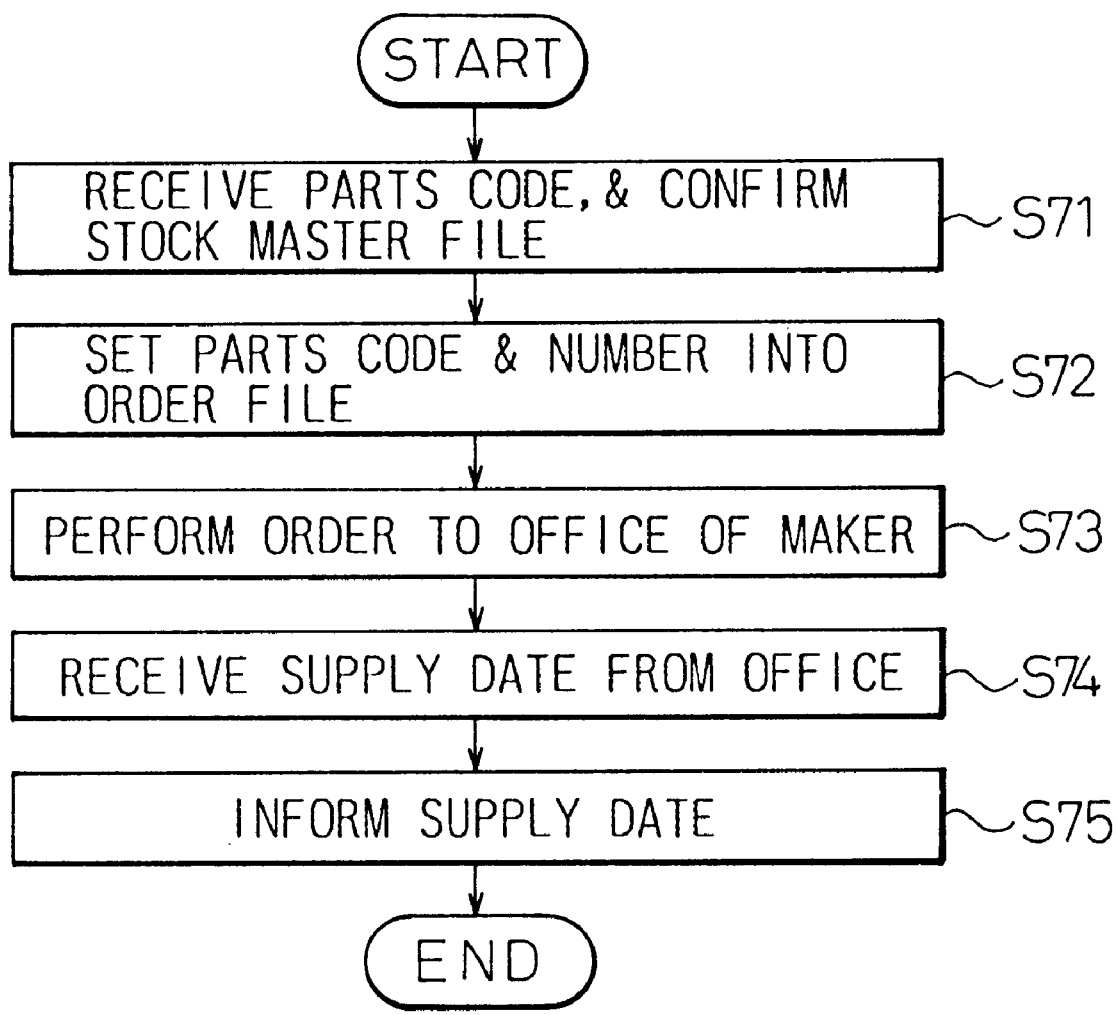
FIG. 13 is a process flowchart for stock management.
Figure 42:
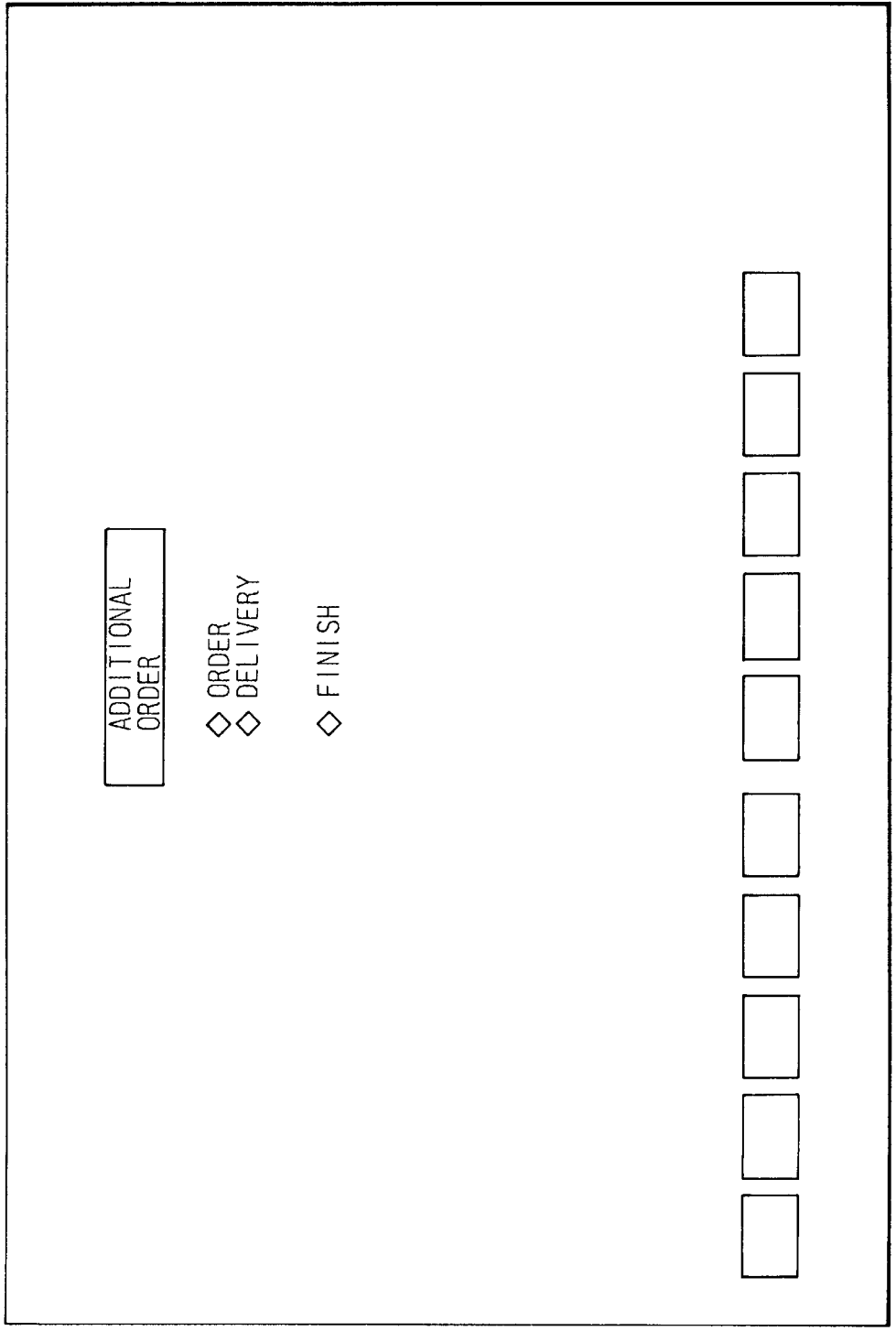
FIG. 42 shows one example of an additional order menu display.

FIG. 13 is a process flowchart for the stock management. When the host computer 31 receives the service parts code from the portable terminal 21, the stock managing unit 37 checks whether there are the stock of the service parts in the stock file 38 (step S71). When there is no stock of the service parts in the stock file 38, the office worker orders the service parts based on the menu shown in FIG. 42 and sets the parts code and quantity of the service parts in the order file 39 (step S72).

The service parts, which are set into the order file 39, are ordered from the host terminal 31 to the host computer 50 provided in the office of the car maker (step S73). The host computer 50 returns the data, which indicates the delivery date of the service parts, to the host terminal 31 (step S74). This data is informed from the stock managing unit 37 to the service estimating unit 33, and used as the service estimating data (step S75).

Figure 45:
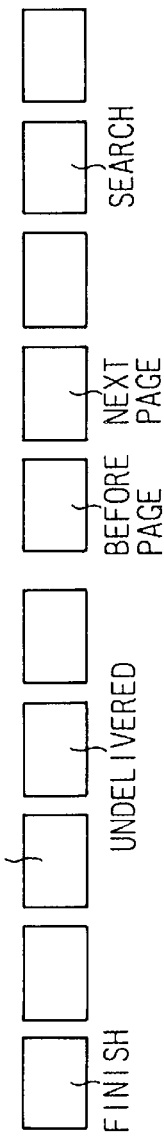
FIG. 45 shows one example of an undelivered parts display.

On the other hand, when there is the stock of the service parts, the bar code reader 77 (see FIG. 6) is connected to the portable terminal 51. That is, the barcode reader 77 reads bar codes each of which is attached to each service parts, and sends the information to the host computer 31. The host terminal 31 prepares the list of the service parts, which are delivered, as shown in FIG. 44. Further, the host terminal 31 prepares the service parts, which are not delivered, as shown in FIG. 45.

Based on above service estimating process, it is possible to eliminate an order bill used for ordering the service parts, and to eliminate the processes which refers to the work sheet of the service parts and inputs the service parts into the host terminal 31. Accordingly, it is possible to prevent input errors when inputting the service parts. Further, it is possible to collectively manage the parts image file 34, the parts file 35, etc., in the host terminal 31.

Further, it is possible to automatically calculate the service expense the parts code and the cost for mounting the service parts in the host terminal 31. This calculation may be performed in the portable terminal 51 by including the data for calculating the expense therein. Further, since the service estimating process is relevant to the stock managing process, it is possible to quickly sort the information concerning the stock state and the delivery date of the service parts. Accordingly, it is possible to obtain precise and suitable stock and the service data.

Figure 47:
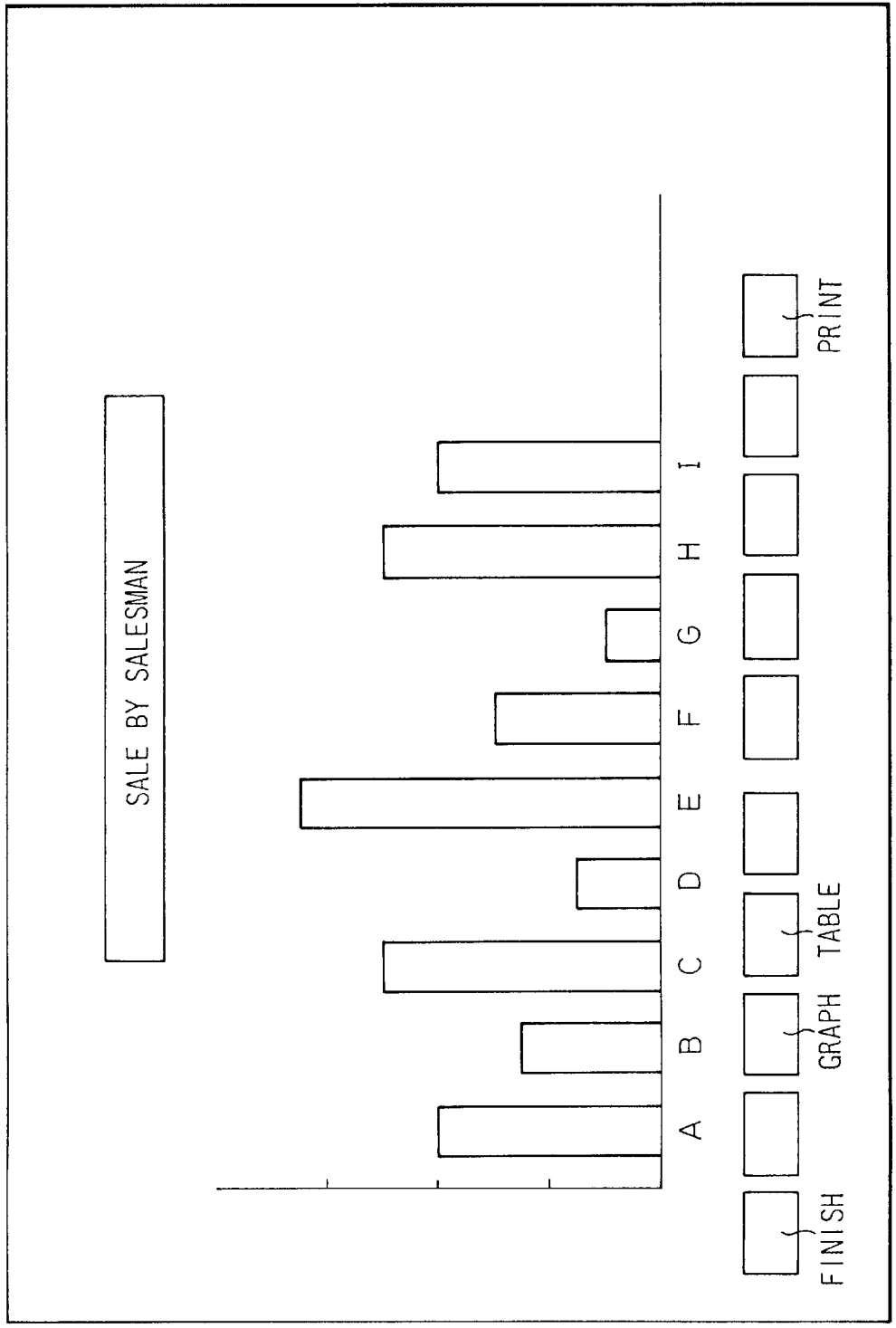
FIG. 47 shows one example of a sales result display.

The stock management is performed based on the menu for sales management shown in FIG. 46. The sales result graph is prepared for each salesman for the car which is sold based on the new car estimation, and displayed on the display unit 42 in the host terminal 31 as shown in FIG. 47. For the service expense, each service expense is collected, and the graph of the result is displayed as the list of the service expense as shown in FIG. 48.

Figure 49:
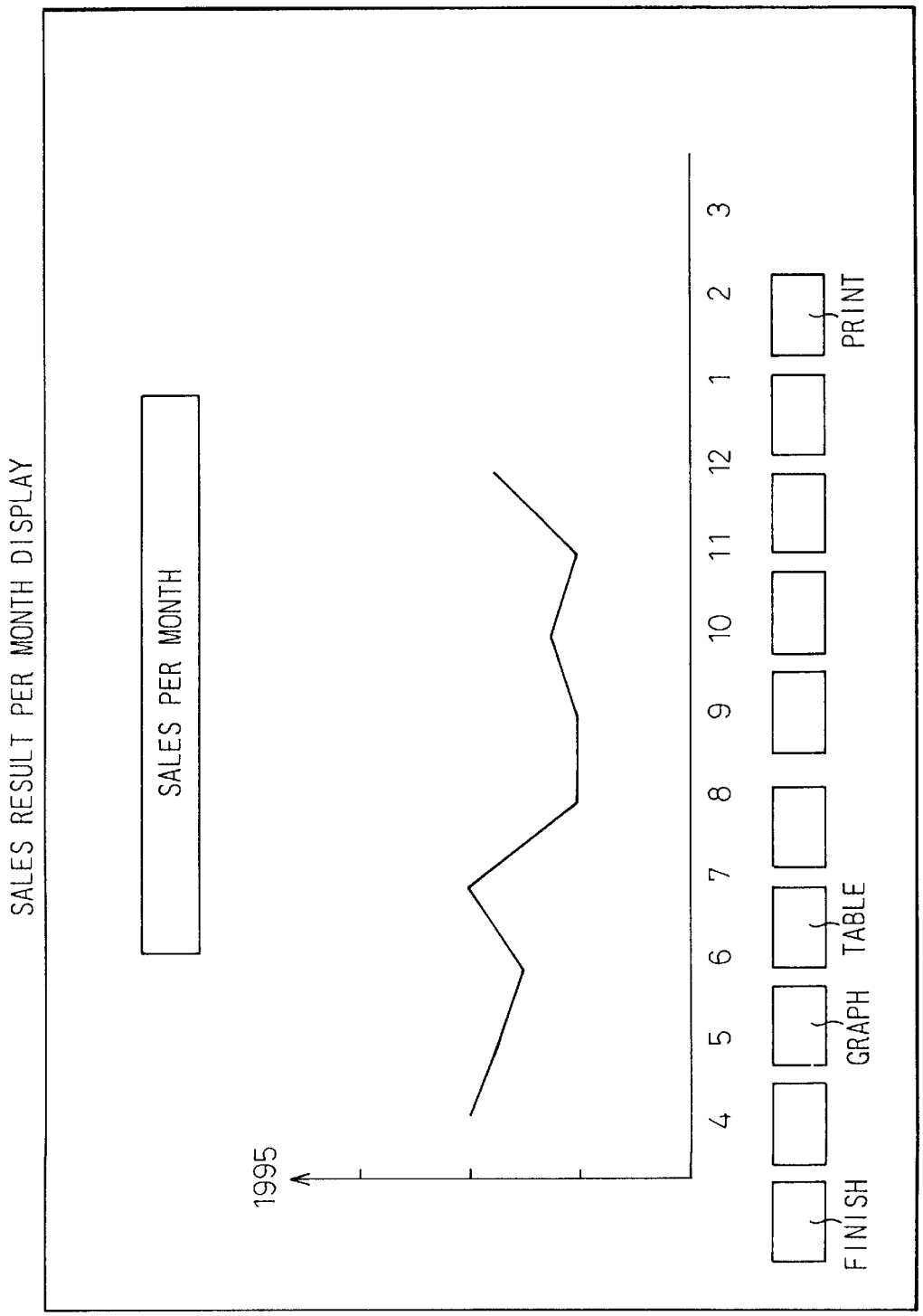
FIG. 49 shows one example of the sales result per month display.

Further, total sales is collected for every month, and the graph of the result is displayed as shown in FIG. 49.

We claim:

1. A customer data processing system provided in a shop for use during a process of purchasing a new vehicle, said system comprising:
   a factory terminal means;
   an office terminal means connected to said factory terminal means through a transmission line; and
   a host computer connected to said office terminal,
   wherein said factory terminal means comprises:
      a parts image data storage unit for registering service parts data for goods in the form of image data;
      an image display unit for reading images of service parts from said parts image data storage unit and displaying the images of goods on a screen; and
      a parts input unit for detecting selection of the images of goods designated in the displayed image of goods, and applying service parts code which corresponds to the selected service parts, and
   wherein said office terminal means comprises:
      a parts data storage unit for registering service parts prices for goods; and
      a service estimating unit connected to said parts data storage unit for preparing a service estimating sheet for the desired goods during the process of purchasing a new vehicle based on the service parts prices.

2. A customer data processing system as recited in claim 1, wherein said office terminal means further comprises:
   a stock managing unit for managing stock of service parts; and
   an order unit for ordering the desired service parts to said host computer when there is no stock of service parts,
   wherein said service estimating unit prepares the service estimation sheet by filling a completion day of service in the service estimating sheet based on the delivery date of the service parts as provided by said host computer.

3. A customer data processing system as recited in claim 1, wherein said office terminal means further comprises:
   another parts image data storage unit which is the same unit as provided in the factory terminal, and
   wherein, when displaying the service parts images on said factory terminal means, said image display unit displays the service parts image which are read from said another parts image data storage unit in the office terminal means.

4. A customer data processing system, comprising:
   a sales shop connected to an office of a car maker through a network, and separated into three areas consisting of a new vehicle showroom, a shop office and a service station,
   said new vehicle showroom including a customer terminal handled by a customer and a printer during a process of purchasing a new vehicle,
   said service station including a portable terminal for communicating with a host terminal to check service parts,
   said shop office including said host terminal and a printer, said host terminal being connected to a host computer provided in said office of the car maker through said network,
   said host terminal and said customer terminal being connected to each other through a wire or wireless method, and
   said host terminal and said portable terminal being connected to each other through the wireless or wire method.

5. A customer data processing system as recited in claim 4, wherein said customer terminal comprises:

a display unit for displaying the contents of a questionnaire which is answered by the customer;

an input unit for inputting the contents of the questionnaire by using a light pen;

a new vehicle estimating unit for preparing an estimation sheet of the new vehicle;

a new vehicle file for storing price data and option data for new vehicles;

an assessment file for defming a trade-in price based on a type and a manufactured year;

a catalog file for storing catalog data for the new vehicle; and a kind of vehicle selecting unit for selecting the kind of vehicle in a range of an estimated cost provided by the customer.

6. A customer data processing system as recited in claim 4, wherein said host terminal comprises:

an input unit;

a display unit;

a service estimating unit for preparing the service estimating sheet as to service expense for the new vehicle to be serviced during the process of purchasing the new vehicle;

a stock managing unit for processing stock data of the service parts; and an order unit for ordering the service parts to said host computer.

7. A customer data processing system as recited in claim 6, wherein said host terminal further comprises:

a customer file for storing customer data and questionnaire data;

a parts image file for storing parts code data and image data;

a parts file for storing price data for each service parts;

an estimating file for storing the estimating data to be filled in the service estimating sheet;

a stock file for storing stock data of service parts; and an order file for storing service parts names to be ordered and the number thereof.

8. A customer data processing system as recited in claim 4, wherein said portable terminal comprises:

a service parts input unit for inputting necessary service parts; and a liquid crystal display for displaying the images of the parts.

9. A customer data processing system as recited in claim 4, wherein said portable terminal is connected to a parts image file in order to directly read the contents of said parts image file.

* * * * *